(12) United States Patent
Wu et al.

(10) Patent No.: US 6,519,051 B1
(45) Date of Patent: Feb. 11, 2003

(54) FAX THROUGH DATA NETWORK AND REMOTE ACCESS NETWORK APPLIANCE CONTROL APPARATUS AND METHOD

(75) Inventors: Chun-Chu Archie Wu, San Carlos, CA (US); Pei Sern, San Jose, CA (US)

(73) Assignee: Shinestar LLC, San Jose, CA (US)

( * ) Notice: Subject to any disclaimer, the term of this patent is extended or adjusted under 35 U.S.C. 154(b) by 0 days.

(21) Appl. No.: 09/519,839

(22) Filed: Mar. 6, 2000

(51) Int. Cl.$^7$ .............................. H04N 1/00; G06F 13/00
(52) U.S. Cl. ...................... 358/1.15; 358/402; 358/407; 358/442; 379/100.01; 379/100.06
(58) Field of Search ................................ 358/1.15, 402, 358/403, 407, 434, 440, 442, 468; 379/93.01, 93.24, 100.01, 100.05, 100.06, 100.08, 100.09, 100.15

(56) References Cited

U.S. PATENT DOCUMENTS

| | | | | |
|---|---|---|---|---|
| 5,872,845 | A | * 2/1999 | Feder | ........................ 358/442 |
| 5,940,479 | A | 8/1999 | Guy et al. | |
| 5,956,681 | A | * 9/1999 | Yamakita | .................... 704/260 |
| 5,991,291 | A | 11/1999 | Asai et al. | |
| 6,005,677 | A | 12/1999 | Suzuki | |
| 6,012,100 | A | 1/2000 | Frailong et al. | |
| 6,020,980 | A | 2/2000 | Freeman | |

FOREIGN PATENT DOCUMENTS

EP          0 836 315 A2       4/1998

OTHER PUBLICATIONS

Real–time internet faxing tool for multi–site corporations and service providers (1999 VocalTec Communications 1999; 4 pp).

"Get your faxes through email" (http://efax.com, downloaded Sep. 6, 1999; 5 pp.).

"Internet based global fax messaging service" (http://fax2net.com, downloaded Sep. 6, 1999; 6 pp.).

* cited by examiner

Primary Examiner—Madeleine Nguyen
Assistant Examiner—Joseph R. Pokrzywa
(74) Attorney, Agent, or Firm—R. Michael Ananian; Dorsey & Whitney LLP

(57) ABSTRACT

A FAX-through data network includes a receiver side LAN end station and a sender side LAN end station. A first converter receives a FAX communication from the sender FAX and generates a FAX packet. The FAX packet includes a predefined session port number and a receiver FAX-network ID. A FAX-network server receives the FAX packet, extract the receiver FAX-network ID, performs a lookup of a destination IP address in a mapping table and forwards the FAX packet to the destination IP address. A second converter intercepts and identifies the FAX packet, extracts the FAX communication from the FAX packet, establish a communication with the receiver FAX without routing a signal through the PSTN and transmits the FAX communication to the receiver FAX machine. A remote access appliance control apparatus includes an appliance side LAN end station. An appliance control packet is generated by the remote network user and includes a predefined session port number, an appliance network ID and the control command. An appliance network server receives the appliance control packet, extracts the appliance network ID, looks-up a corresponding destination IP address in a mapping table, and forwards the appliance control packet to the destination IP address. An appliance converter intercepts and identifies the appliance control packet, extracts the control command and asserts the control command to the appliance using the appliance communication protocol. Advantages include the ability to share the IP address of a LAN end station. The invention also eliminates local and long distance toll cost charge for FAX communication.

24 Claims, 26 Drawing Sheets

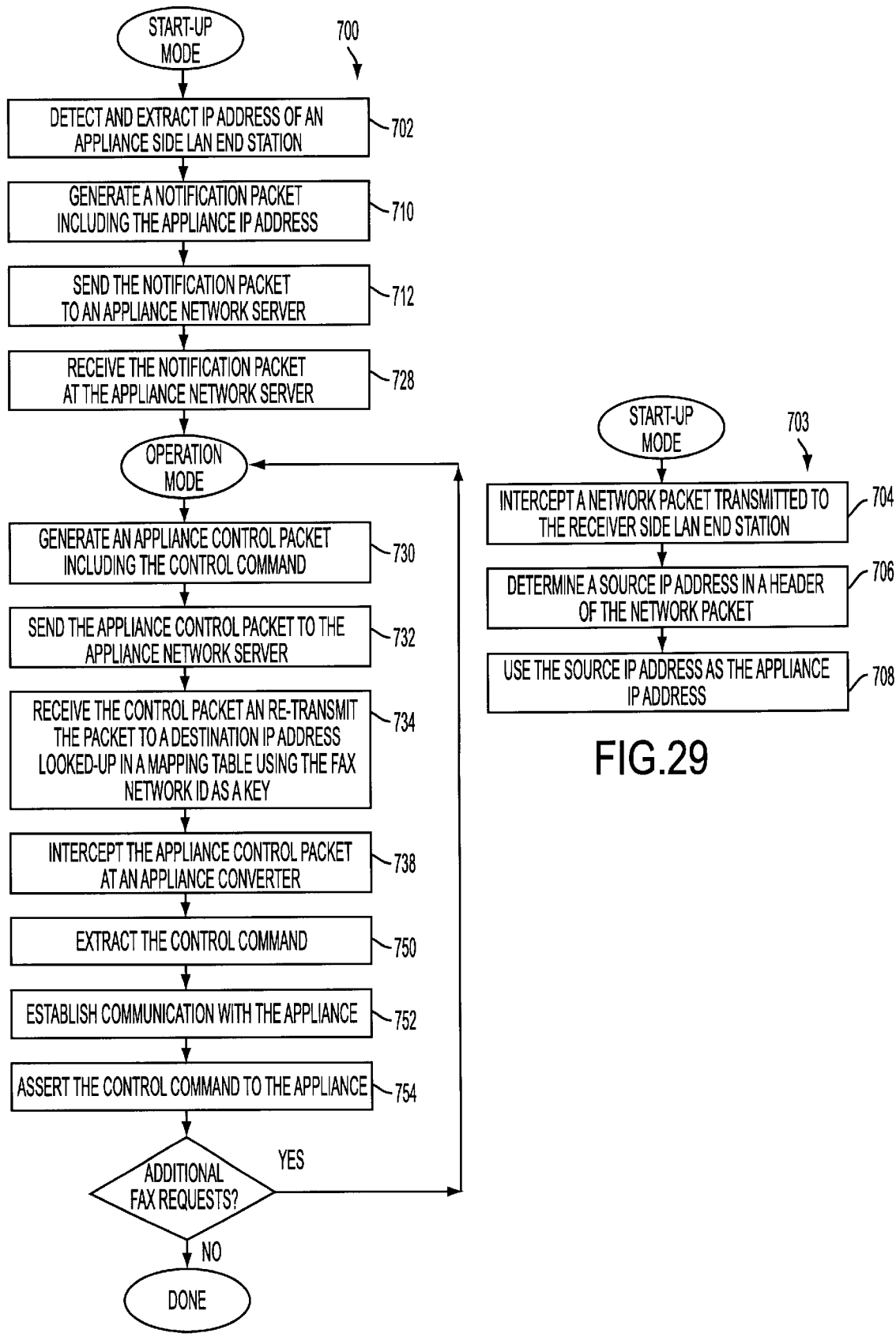

FAX THROUGH DATA NETWORK AND REMOTE ACCESS NETWORK APPLIANCE CONTROL APPARATUS AND METHOD

FIELD OF THE INVENTION

The present invention relates to a FAX-through data network and a remote access appliance control apparatus and method. In particular, the invention utilizes a data network to transfer a FAX data packet or an appliance control packet to a FAX machine or an appliance, respectively. The present invention discovers the capability to share an internet protocol (IP) address of a LAN end station and the ability to intercept network data packets transmitted to the LAN end station in order to identify a FAX data packet or an appliance control packet.

BACKGROUND

A FAX transmission using the public switched telephone network (PSTN) is processed with the same methodology as a voice telephone connection. To transfer a document via FAX, the transmitting FAX machine starts up a connection request by dialing a receiving party's telephone number. The PSTN acts both as a destination locator and a channel provider with two tasks. First, the PSTN will find the destination FAX location and alert the receiving FAX to answer the transmission request. Second, the PSTN will make a channel connection between the transmitting FAX and the receiving FAX.

As depicted in FIG. 1, there is no difference to the PSTN whether handling a FAX or a voice telephone connection. Due to the fact that a real time response in a conversation between two parties is required, the cost of the connection is measured by the duration of the connection and the distance between the two parties. This cost measurement is set mostly because a voice conversation requires a real time response since the human ear and brain can only tolerate a small amount of latency.

This cost measurement is, however, inappropriate for FAX transmissions since a real time response, measured in 0.1 seconds of time, is not required. Furthermore, the cost measurement of the duration of the connection is not particularly appropriate. A human conversation always exchanges information at a constant rate. Therefore, the conversation always takes the same amount of time to get a message across. In other words, the connection time equals the amount of information exchanged. On the other hand, a FAX communication can utilize a faster data rate than the data rate used by voice communications (when channel bandwidth is available) or slow down the data rate when channel traffic is congested. In addition, a latency in the response time on the order of one or more minutes is tolerable for FAX transmissions. As such, a correct method for measuring the cost of FAX communication is a measurement of the transferred data size instead of the call duration, provided the channel bandwidth is scalable. In summary, FAX customers pay expensive PSTN toll charges for a service which is not needed.

In recent years, the bandwidth of data network connections between two end user computers or two end station computers has expanded to meet the data transfer requirements discussed above. These data networks are readily available in every trade industry and business. Data networks have imposed larger latency compared to the PSTN, but it is acceptable when dealing with FAX transmissions. In addition, the cost of the data transfer is measured by the size of the exchanged information in many cases. For example, a 56K modem connection can transfer 56 Kbits of information per second (560K bit per 10 second or 201,600 Kbit per hour) free of charge in a global data network, the Internet. In fact, other data network connection technologies can provide even higher bandwidth. Consequently, since the average size of a FAX communication is about 480K, the cost of a FAX transmission over a data network is negligible (free of charge).

Based on the argument described above, FAX services utilizing data networks should be quite common. In reality, there are very few such deployments. The reason is due to the fact that data networks were not fully deployed until recently. Moreover, FAX machines based on the PSTN have dominated the market for more than three decades. FAX equipment vendors have no incentive to move over to data networks because the cost of FAX transmissions are paid by the end user, not by the equipment vendor.

As depicted in FIG. 2, a data network topology is comprised of multiple local area networks (LAN) connect together by a giant, a wide area network (WAN), the Internet. Within a LAN, there are multiple End stations connected thereto. Each end station is assigned a unique identification number referred to as its Internet Address or the IP address. Any data exchanged between two parties will need to identify the destination or end station location by its corresponding IP address. The connection between the LAN and the WAN is separated by a Router, which will relay the data to the WAN if the destination IP address is not within the LAN.

The data network also uses a session port to identify the type of application. There are "well known" session port numbers which are fixed in the Internet to represent application flow. For example, the hyper text transfer protocol (HTTP) uses session port 80, while electronic mail (E-Mail) uses session port 110. On the other hand, there are a few unassigned session ports available for individual applications. Since there are many application communications in the data network, a session port attached to a transmitting data package in the network will enable the receiving party to identify and process the data package in order to collect the information in the data package.

FIG. 3 depicts one technique for utilizing a data network in the FAX transmission process. This type of service establishes a central FAX-network server which connects one end to the PSTN and the other end to the data network. Each receiving customer will be given a unique PSTN telephone number for the FAX-network server to identify the destination. Users are also required to have an E-Mail address in order to receive the electronic form of the FAX transmission which is sent through the unique PSTN number.

The transmitting party is required to make a PSTN call to the central FAX-network server. Although, the dialed PSTN number is used to uniquely identify the FAX receiver, the FAX number is physically connected to central FAX-server through the PSTN network which is similar to a corporation direct line. The FAX-network server will then receive the FAX data and put it in a temporary storage. The transmitting party performs the same operations as a normal call through the PSTN since it dials and faxes through a regular telephone number.

The FAX-network server perform two tasks. First, it identifies the receiving PSTN number and maps it to the E-Mail address of the receiving party. Then, it retrieves the stored FAX data, repackages the data into a data network format and sends the data through the data network to the individual E-Mail address. The receiving party can retrieve the E-Mail and either view the FAX document in an electronic format or as the printer's printout.

The problem with this method is that it requires the transmitting party to place a PSTN toll call to the central FAX-network server. Therefore the toll cost for the call is not reduced if the distance between the sender and the receiver is shorter than the distance between the sender and the central server. Moreover, this method provides only a conversion from the FAX information to the electronic format without a reduction in cost. In addition, this technique does not provide a good solution for receiving a FAX from a heritage FAX machine.

FIG. 4 depicts an additional FAX system which utilizes a data network to deliver a FAX communication. This method requires the transmitting FAX to place a PSTN call to its local FAX-network server, similar to the previous method. However, instead of using a central FAX-network server to receive the incoming FAX communication, this method sets up multiple regional FAX-network servers to reduce the long distance telephone toll charge. The local or regional FAX-network server will receive and store the FAX communication in a temporary data buffer. This local server then repackages the FAX communication into a data network format and forwards it to a remote FAX-network server which is closer to the receiver FAX. The remote FAX-network server will unpack the FAX communication to restore the information into the original FAX format and make a FAX telephone call through the PSTN to the receiving FAX machine. Finally, the receiving FAX machine will get the FAX communication, without the cost of a direct long distance call from the sender to the receiver. The receiver's PSTN telephone number must be registered in all the servers in order for the technique to function. For the local server, the receiver's PSTN telephone number will be used to locate the proper remote-server to which the FAX communication should be sent. For the remote server, the receiver PSTN telephone number is used to make a PSTN toll call from the remoter server to the receiving FAX machine.

Although this technique eliminates the long distance toll charge by using a data network, the technique suffers from two drawbacks. First, the requirement of setting up several possible regional/local FAX-network servers is costly. Second, the regional/local PSTN toll cost in many sub-urban areas will still be charged a fee.

FIG. 5 depicts a further FAX system which also utilizes a data network to deliver a FAX communication. Each FAX machine is required to connect to a PBX emulator that converts the FAX communication to data network format. Each PBX emulator is connected to an end station having a unique IP address. Each end station performs full network protocol and application functions in order to send and receive data network packets containing the FAX communication. This implementation also requires each end station to construct a full data base that contains a mapping table which can map PSTN telephone numbers to data network IP addresses.

One problem with this technique is that each end station is required to have a dedicated IP address which is a precious resource of the Internet. In addition, the end stations need to perform full network protocol operations which are extremely complicated in comparison to a simple FAX transfer. This results in an overly complicated consumer application. Moreover, since each end station has a dedicated IP address and performs full network protocol functions, the network administration system is required to performs maintenance and administration routines for the end station which further consumes administrator resources. In effect, the complexity required to implement the end stations renders this technique cost ineffective.

What is needed is a technique for a FAX transmission system that utilizes a FAX-through data network without requiring a plurality of regional/local FAX-network servers. In addition, a need remains for a technique that eliminates the use of the PSTN. Also, there is a need for a low cost implementation that does not require assignment of an internet address to users in order to utilize the invention and receive FAX communications.

SUMMARY

The present invention overcomes the identified problems by providing a FAX-through data network and remote access appliance control apparatus and method. In particular, the invention utilizes a data network to transfer a FAX data packet or an appliance control packet to a FAX machine or an appliance, respectively. The present invention discovers the capability to share an IP address of a LAN end station and the ability to intercept network data packets transmitted to the LAN end station in order to identify a FAX data packet or an appliance control packet.

An exemplary embodiment of the apparatus includes a receiver side LAN end station having a receiver IP address and a sender side LAN end station having a sender IP address. A first converter receives the FAX communication from the sender FAX and converts the FAX communication to a network packet format to generate a FAX packet. The FAX packet includes a predefined session port number and a receiver FAX-network ID. A FAX-network server receives the FAX packet, extracts the receiver FAX-network ID, performs a lookup of a corresponding destination IP address in a mapping table and forwards the FAX packet to the destination IP address. A second converter intercepts and identifies the FAX packet, extracts the FAX communication from the FAX packet, establishes a communication link with the receiver FAX without routing a signal through the PSTN and transmits the FAX communication to the receiver FAX machine.

In an embodiment for asserting a control command to an appliance from a remote network user, the invention includes an appliance side LAN end station having an appliance IP address which is shared by the appliance. An appliance control packet is generated by the remote network user and includes a predefined session port number, an appliance network ID and the control command. An appliance network server receives the appliance control packet, extracts the appliance network ID, looks-up a corresponding destination IP address in a mapping table, and forwards the appliance control packet to the destination IP address. An appliance converter intercepts and identifies the appliance control packet, extracts the control command and asserts the control command to the appliance using an appliance communication protocol.

The invention provides many advantages over known techniques. The present invention includes the ability to share the IP address of a LAN end station, thereby eliminating the need for additional IP addresses. This feature results in apparatus wherein each individual FAX is not required to assume full data network communication protocol operations, which are left to the LAN end station. Consequently, network administration effort required to manage additional FAX devices is negligible. In addition, the invention also eliminates local and long distance toll cost charges for FAX transmissions which can become extensive. Moreover, the invention allows remote access control of appliances which promotes the mobility that is now so prevalent in our society.

BRIEF DESCRIPTION OF THE FIGURES

Additional advantages and features of the invention will become readily apparent upon reading the following detailed description and appended claims when taken in conjunction with reference to the drawings, in which:

FIG. 28 depicts method steps for asserting a control command to an appliance from a remote network user according to an embodiment of the invention;

FIG. 29 depicts additional method steps for detecting an appliance IP address according to an embodiment of the invention;

DETAILED DESCRIPTION

Figure 1:
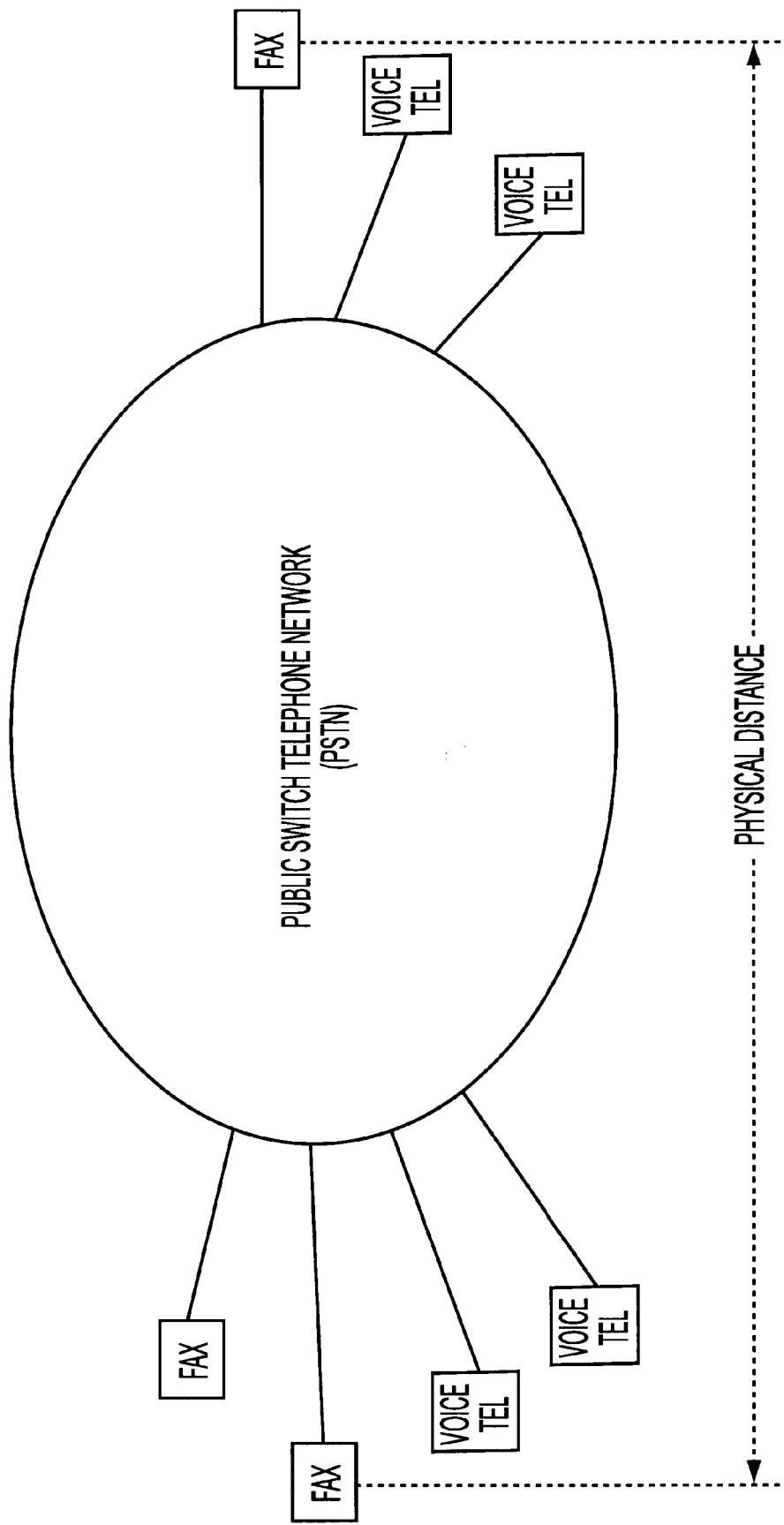
FIG. 1 depicts a FAX transmission and voice communication through the PSTN as known in the art.
Figure 2:
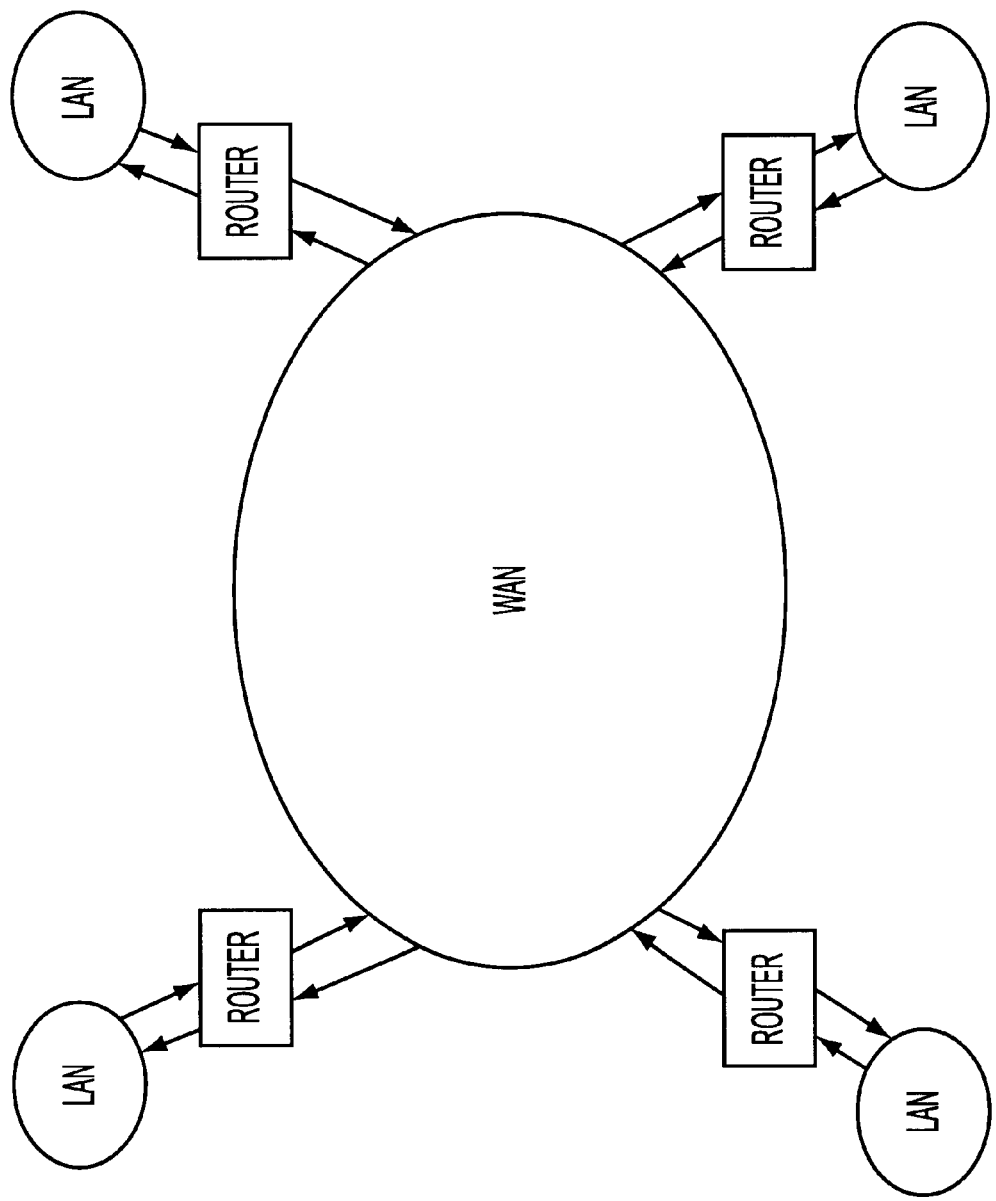
FIG. 2 depicts a data network construct as known in the art.
Figure 3:
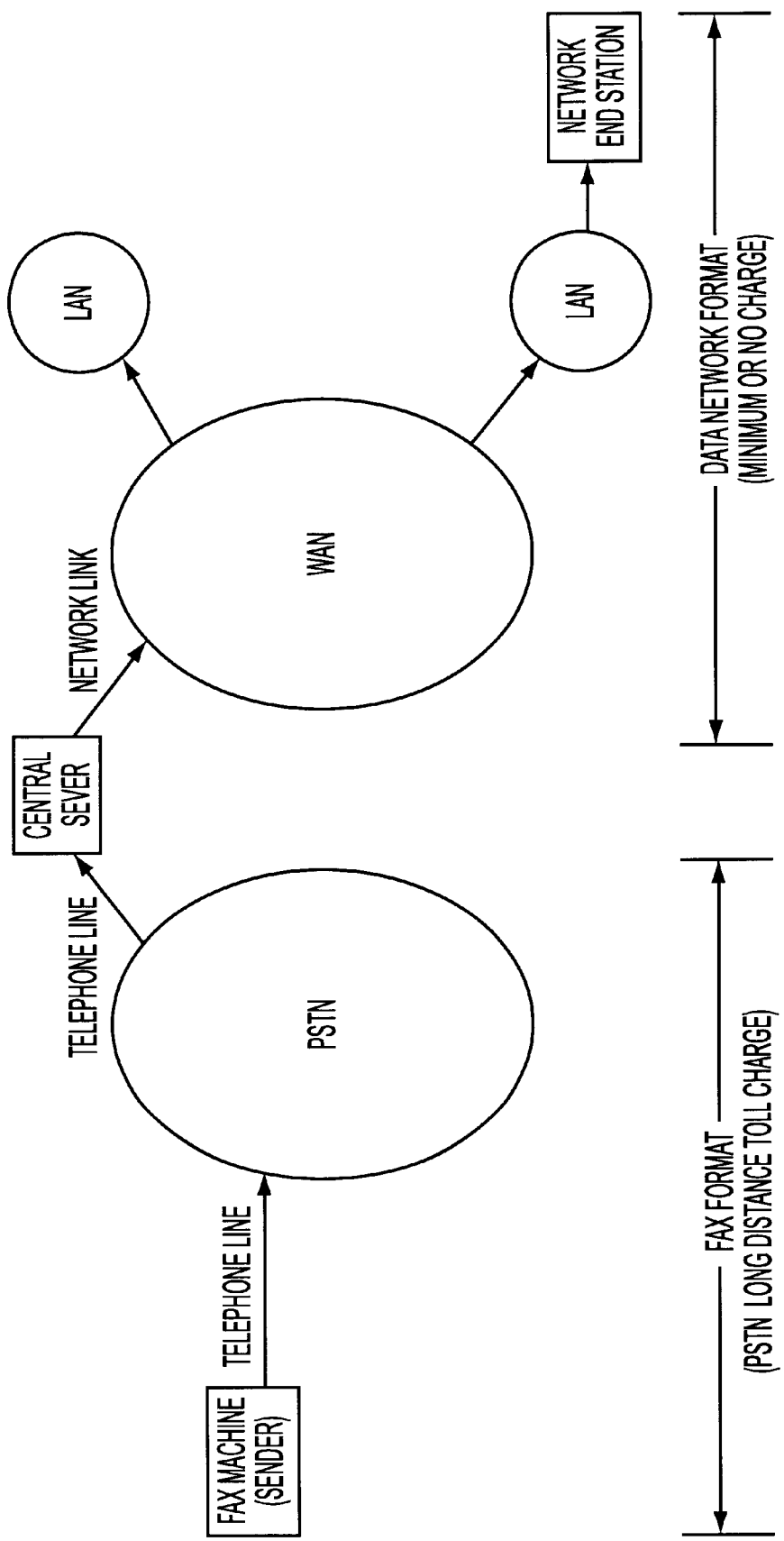
FIG. 3 depicts a prior art technique for FAX transmissions through a data network.
Figure 4:
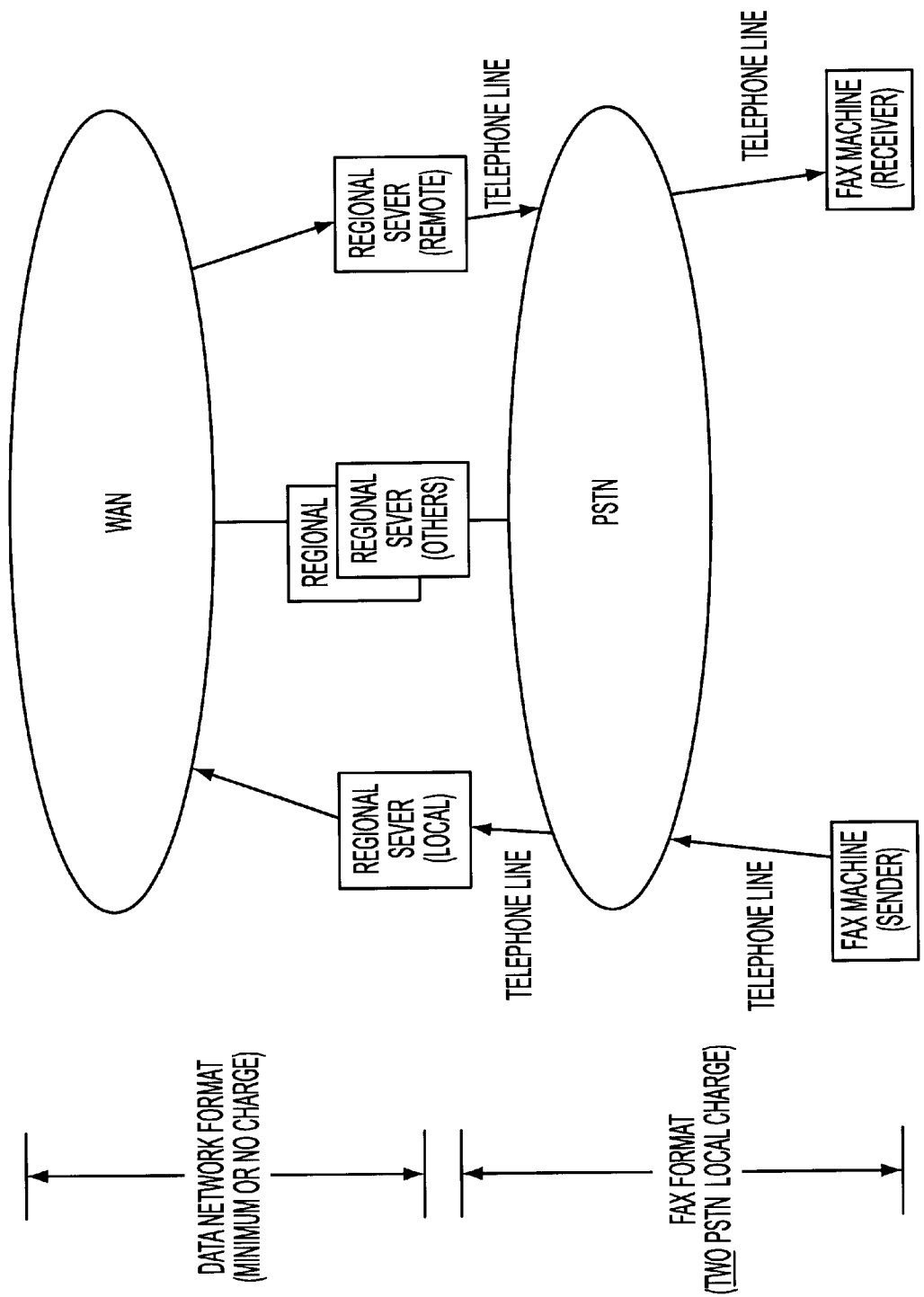
FIG. 4 depicts a prior art technique for FAX transmissions through a data network.
Figure 5:
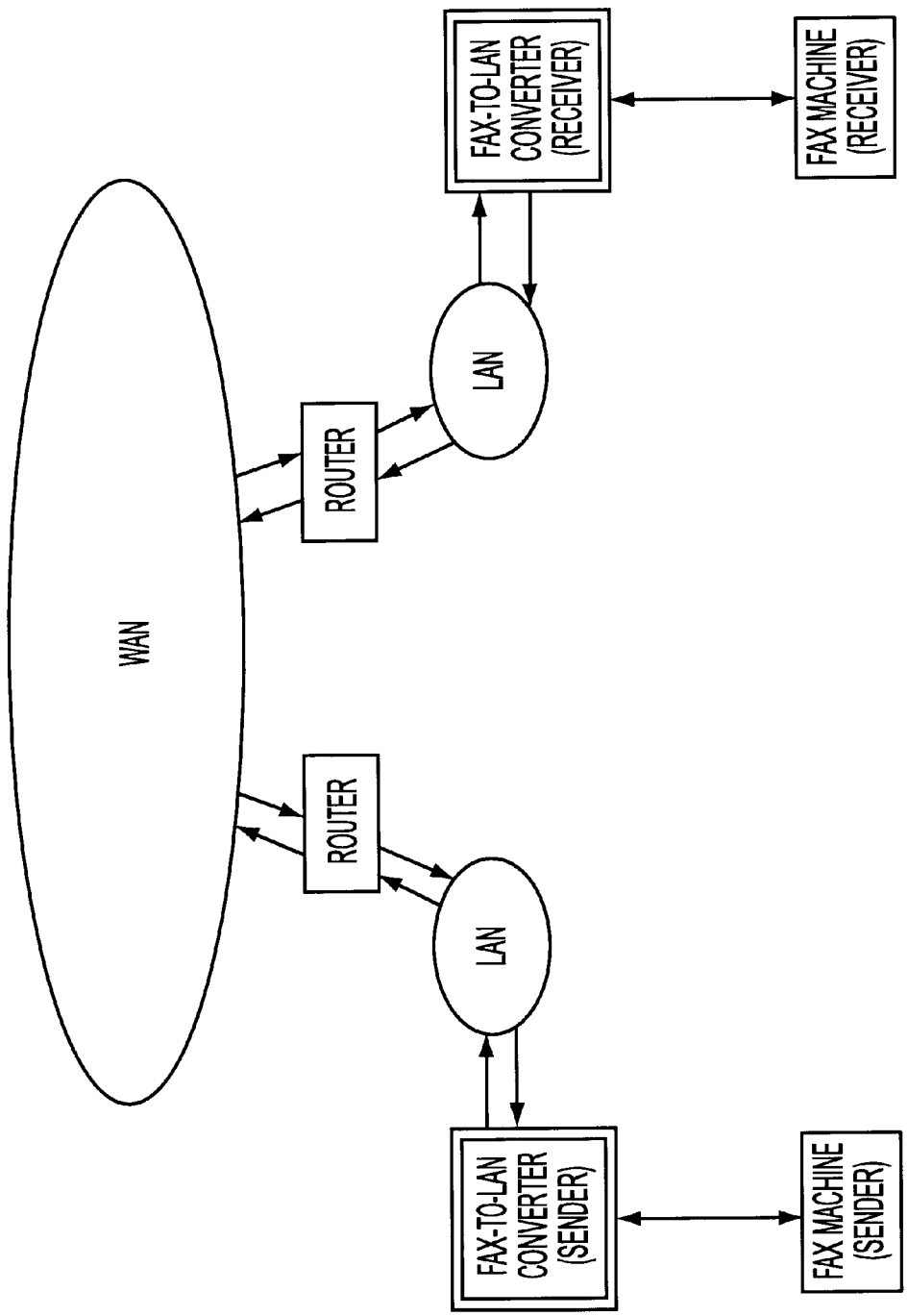
FIG. 5 depicts a prior art technique for FAX transmissions through a data network.

The present invention relates to a FAX-through data network and a remote access appliance control apparatus and method. In particular, the invention utilizes a data network to transfer a FAX data packet or an appliance control packet to a FAX machine or an appliance, respectively. The present invention discovers the capability to share an IP address of a LAN end station and the ability to intercept network data packets transmitted to the LAN end station in order to identify a FAX data packet or an appliance control packet.

1. FAX-through Data Network

A FAX-through data network transfers a FAX communication from a sender FAX to a receiver FAX without routing a signal through a PSTN. In order to implement the FAXthrough data network, an IP address of a LAN end station is shared with an attached converter. The converter in the initial setup stage will act as a transparent device. All traffic transmitted from the end station to a LAN will be passed through. Similarly, all traffic transmitted from the LAN to the end station will be passed through. The converter, however, taps into the contents of network data packets transmitted from the LAN end station to the LAN, analyzes the packet, and learns the IP address of the LAN end station. Once the IP address of the LAN end station is determined, the converter sends a notification packet to a FAX-network server. The notification packet contains a converter FAX-network ID and the IP Address. Each converter is assigned and setup with the unique FAX-network ID when manufactured. These FAX-network IDs are not PSTN phone numbers. They are private phone numbers assigned by the FAX-network administration. Every converter in the FAX-through data network needs to register an IP address with the FAX-network server.

There is no direct data transfer between a sender's LAN router and a receiver's LAN router. Instead, all the FAX packets are sent to the FAX-network server using a predefined session port number. The FAX-network server will search through a mapping table, locate a destination IP address, and forward the FAX packet to the destination IP address. The installation of the FAX-network server is necessary to prevent the duplication of session port numbers between the transmitting converter and the LAN end station. This is due to the fact that the converter has no control over the session port used by the LAN end station. A network application in the LAN end station usually randomly selects the session port number (other than well known ports) to initiate or to respond to a data network transmission. Therefore, the chance of using a duplicate session port number is a likely and possible conflict which needs to be resolved.

This conflict is resolved by installing the FAX-network server in the WAN. The server has a fixed and unique IP address that only the FAX-through data network can access. A network packet transmitted to the FAX-network server is filtered by an identification field in the packet to distinguish between FAX packets and notification packets. The notification packet is fed into an extractor to extract the source IP address and the FAX-network ID. The source IP address and the FAX-network ID are added into the mapping table as a new entry. Since the FAX-network server IP address is unique in the data network, by identifying both the session port number and the FAX-network server IP address, the receiving party can resolve the conflict and properly identify the FAX packet. A system architecture for implementing the FAX-through data network is now described.

A. System Architecture

A first embodiment is described with reference to FIG. 6. A FAX-through data network apparatus 100, that transmits a FAX communication 102 from a sender FAX 104 to a receiver FAX 106 without routing a signal through a PSTN, is depicted. The apparatus 100 includes a receiver side LAN end station 108 having a receiver IP address and a sender side LAN end station 110 having a sender IP address. A first converter 120 receives the FAX communication 102 from the sender FAX 104 and converts the FAX communication 102 to a network packet format to generate a FAX packet 112. The FAX packet 112 includes a predefined session port number and a receiver FAX-network ID. A FAX-network server 150 then receives the FAX packet 112, extracts the receiver FAX-network ID, looks up a corresponding destination IP address in a mapping table (not shown) and forwards the FAX packet 112 to the destination IP address. A second converter 170, which may, but need not be identified to the first converter 120, intercepts and identifies the FAX packet 112. Once identified and intercepted, the second converter 170 extracts the FAX communication 102 from the FAX packet 112, establishes a communication link with the receiver FAX 106, without routing a signal through the PSTN, and transmits the FAX communication 102 to the receiver FAX machine 106.

Figure 6:
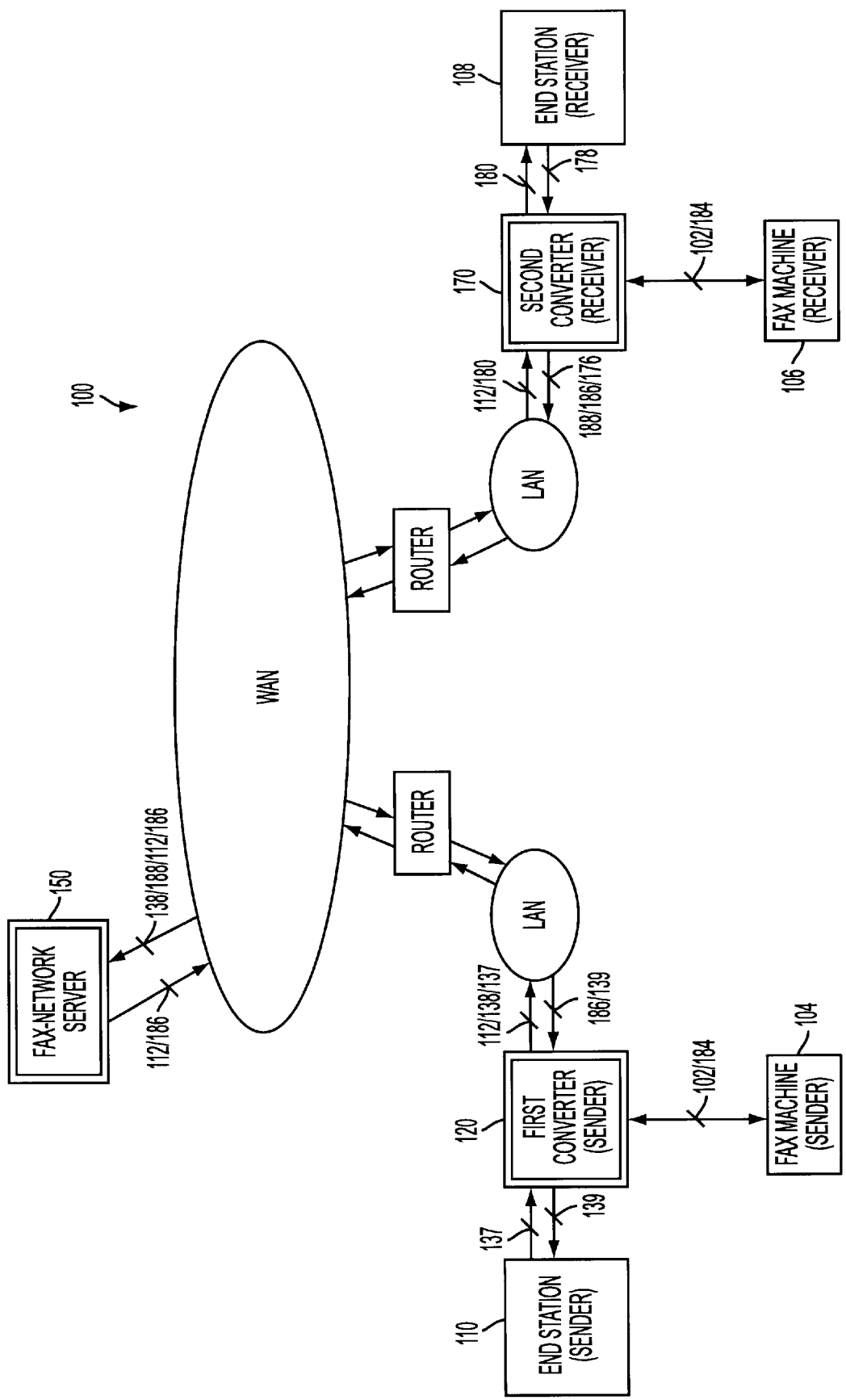
FIG. 6 depicts a FAX-through data network work according to a first embodiment of the invention.
Figure 7:
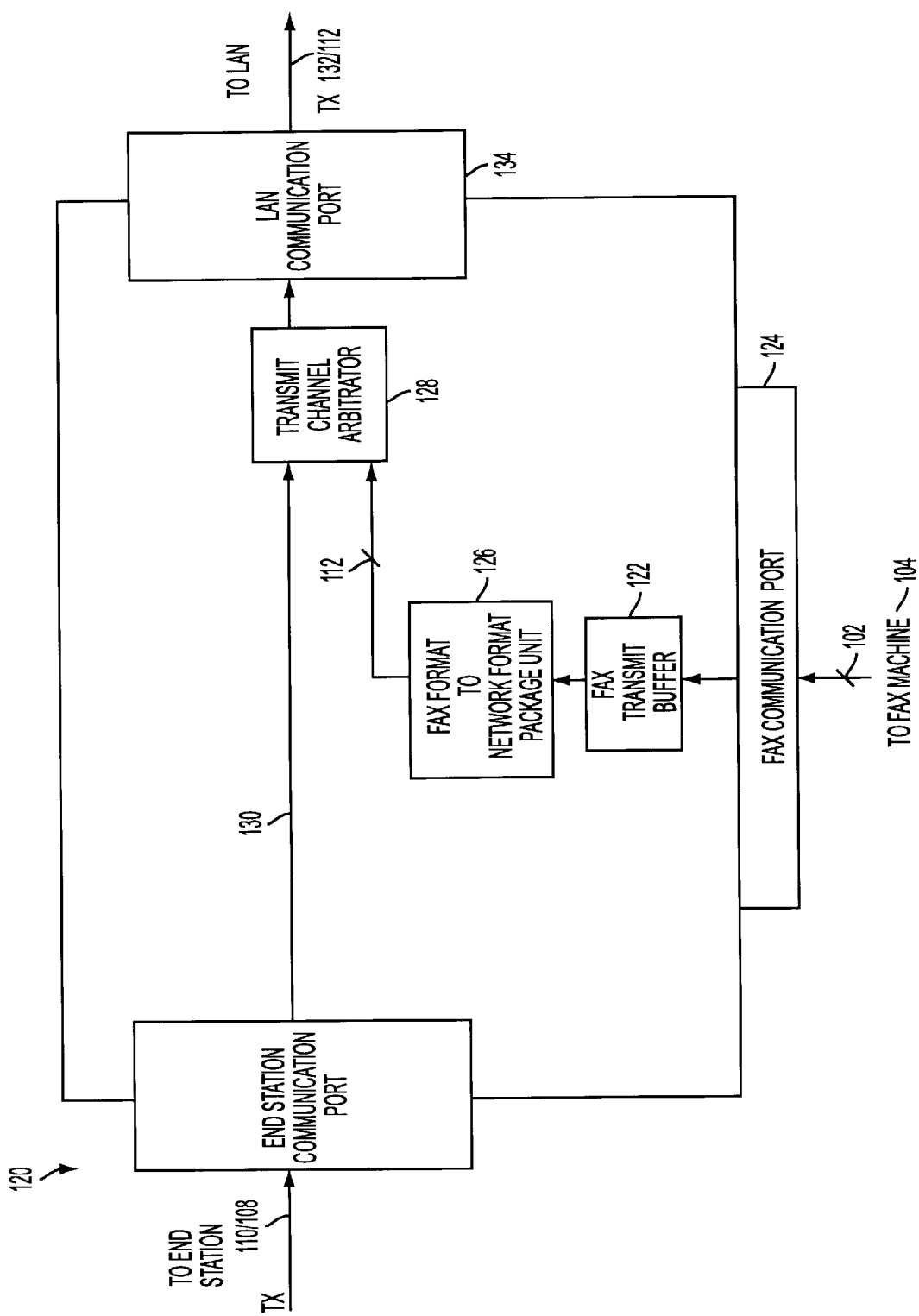
FIG. 7 depicts a first converter according to the first embodiment of the invention, wherein the first converter is in a "send only" configuration.

FIG. 7 depicts one form of the first converter 120, shown generally in FIG. 6. For the purpose of illustration, the first converter 120 is shown in a "send only" configuration and the second converter 170 (FIG. 9) is shown in a "receive only" configuration. The first converter 120 includes a FAX transmit buffer 122 that stores the FAX communication 102 received from the sender FAX 104 via a FAX communication port 124. The FAX communication port 124 establishes a communication link with the sender FAX machine 104 without routing a signal through the PSTN. This direct connection is accomplished, for example, using a PBX emulation device (not shown) as known in the art. A FAX to network package unit 126 then receives the FAX communication 102 and converts the FAX communication 102 to the network packet format to generate the FAX packet 112. The FAX packet 112 includes the redefined session port number in a header of the FAX packet 112 and the receiver FAX-network ID. A transmit channel arbitrator 128 monitors a sender side end station transmit channel 130, such that once the transmit channel 130 is idle, the FAX packet 112 is transferred to the FAX-network server 150 (FIG. 6) via a transmit channel 132 of a LAN communication port 134.

Figure 8:
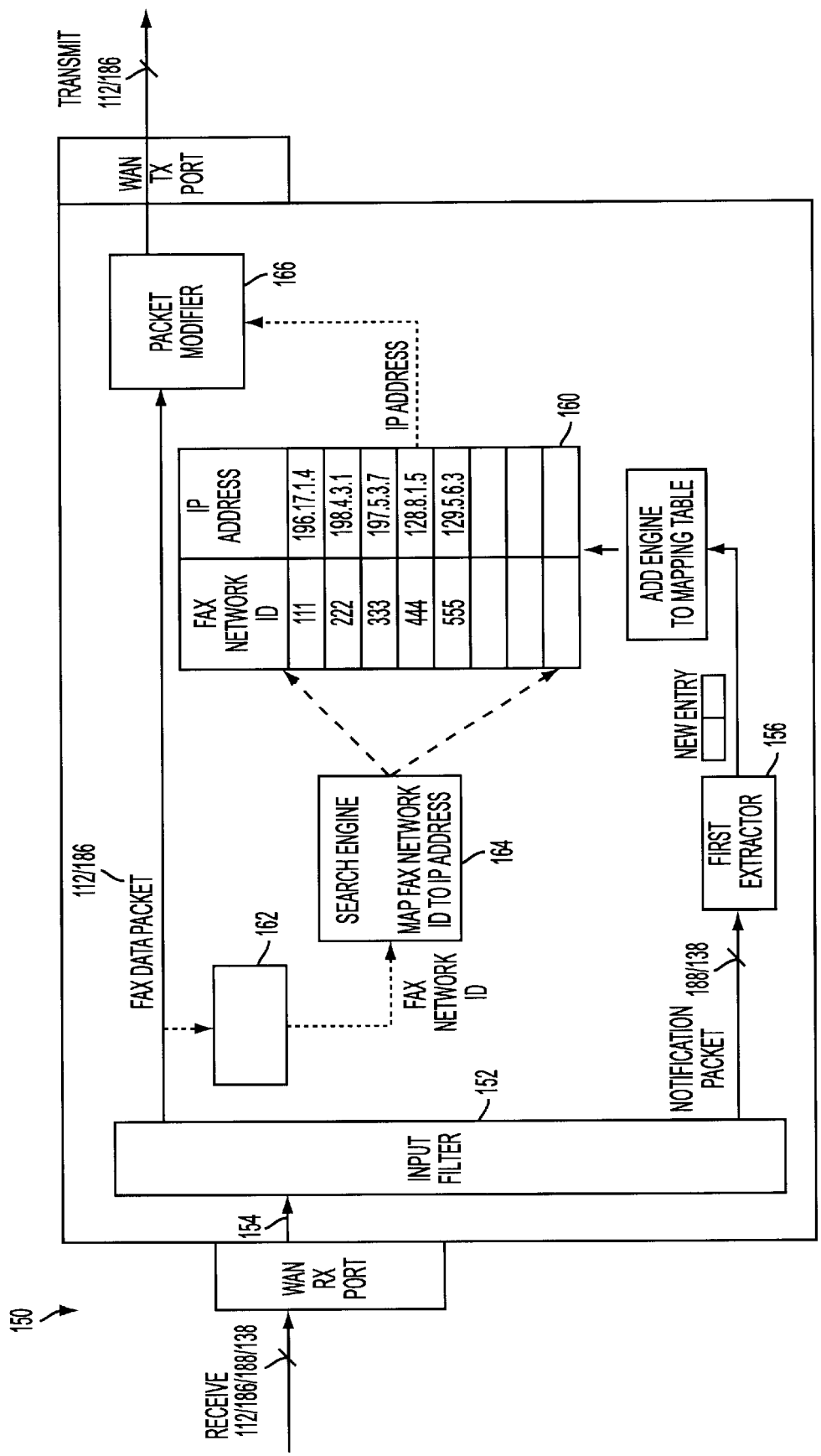
FIG. 8 depicts a FAX-network server according to an embodiment of the invention.

FIG. 8 depicts the FAX-network server 150, shown generally in FIG. 6. The FAX-network server 150, as depicted in FIG. 8, supports the send and receive only configurations of the converters (FIGS. 7 and 9) as well as the dual configurations depicted in FIGS. 10 and 11. The FAX-network server 150 includes an input filter 152 that receives a network packet on a server receive channel 154 and identifies the network packet as a notification packet 138/188 or a FAX packet 112/186. A first extractor 156 determines a FAX-network ID and an IP address contained in the notification packet 138/188 and creates a new entry in the mapping table 160. The mapping table includes a FAX-network ID field and an IP address field. A second extractor 162 determines the destination FAX-network ID from the FAX packet 112/186. A search engine 164 determines the destination FAX IP address from the mapping table 160 by using the destination FAX-network ID received from the second extractor as a key. A packet modifier 166 modifies a destination IP address and a source IP address in a header of the FAX packet 112/186. The packet modifier 166 replaces the destination IP address of the FAX packet 112/186 with the destination FAX IP address and the source IP address of the FAX packet 112/186 with an IP address the FAX-network server 150.

Figure 9:
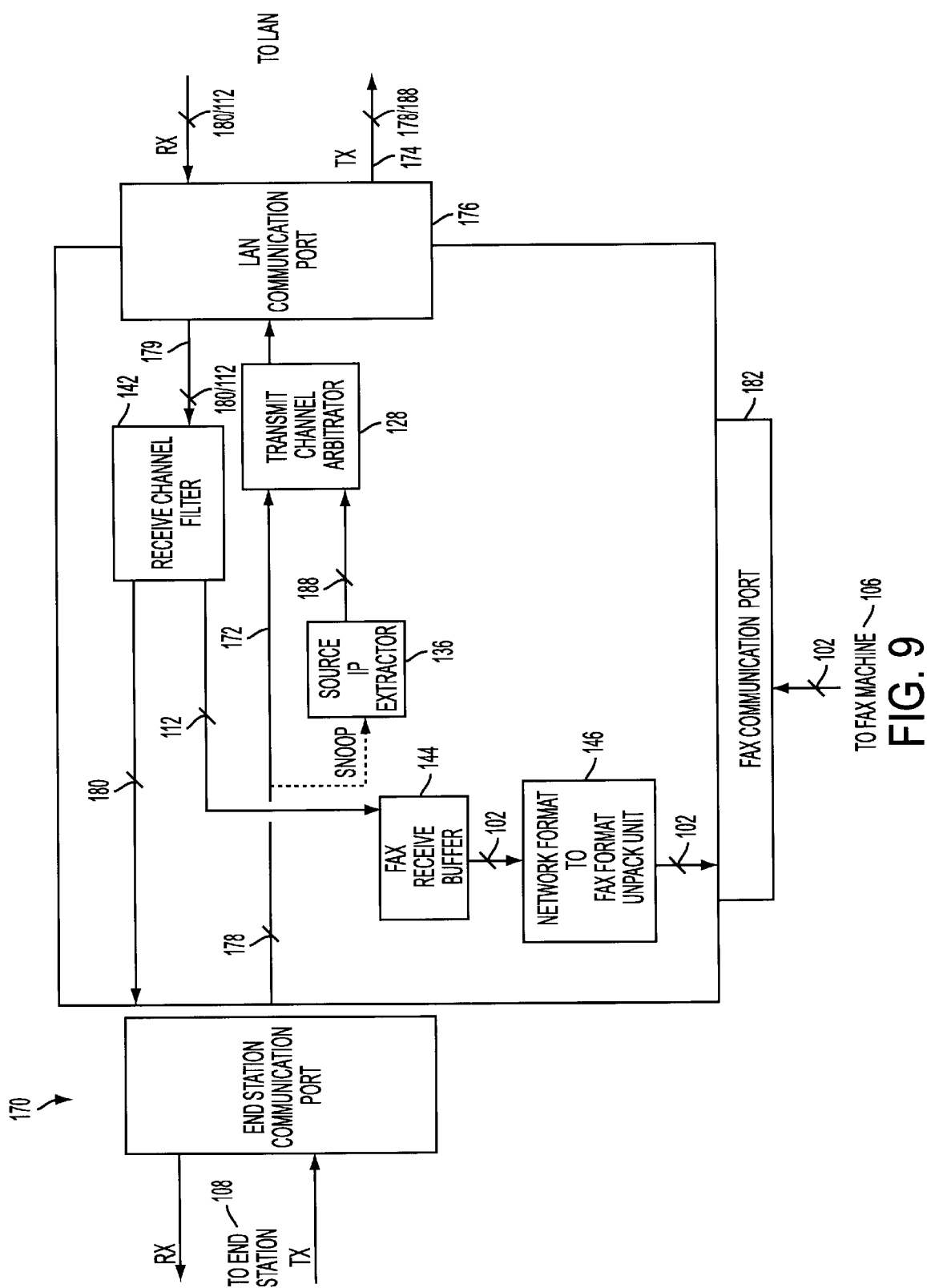
FIG. 9 depicts a second converter according to the first embodiment of the invention, wherein the second converter is in a "receive only" configuration.

FIG. 9 depicts the second converter 170, shown generally in FIG. 6. The second converter 170 includes a source IP extractor 136 that detects and extracts the receiver IP address by monitoring transmit channel 172 for network packets 178 transmitted by the receiver side LAN end station 108. Once the receiver IP address is determined, the source IP extractor 136 generates a notification packet 188 including the predefined session port number in a header of the notification packet 188, the receiver FAX-network ID and the extracted receiver IP address. A transmit channel arbitrator 128 monitors the receiver side end station transmit channel 172. Once the transmit channel is idle, the transmit channel arbitrator 128 transfers the notification packet 188 to the FAX-network server 150 via the transmit channel 174 of the LAN communication port 176.

The second converter 170 does not have a dedicated IP address and therefore shares the IP address of the receiver side LAN end station 108. Consequently, the second converter 170 includes the receive channel filter 142 that monitors a receive channel 179 for network packets 180/112 transmitted to the receiver side LAN end station 108. In order to identify and intercept the FAX packet 112, the receive channel filter 142 monitors a session port number and a source IP address of the network packets 180/112. Once a FAX packet 112 is identified and intercepted from the end station 108, the FAX packet 112 is stored in the FAX receive buffer 144. A network format to FAX format unpack unit 146 then extracts the FAX communication 102 from the FAX packet 112 and forwards the FAX communication 102 to the receiver FAX machine 106 via a FAX communication port 182. The FAX communication port 182 establishes a communication with the receiver FAX machine 106 without routing a signal through the PSTN as described above.

Figure 10:
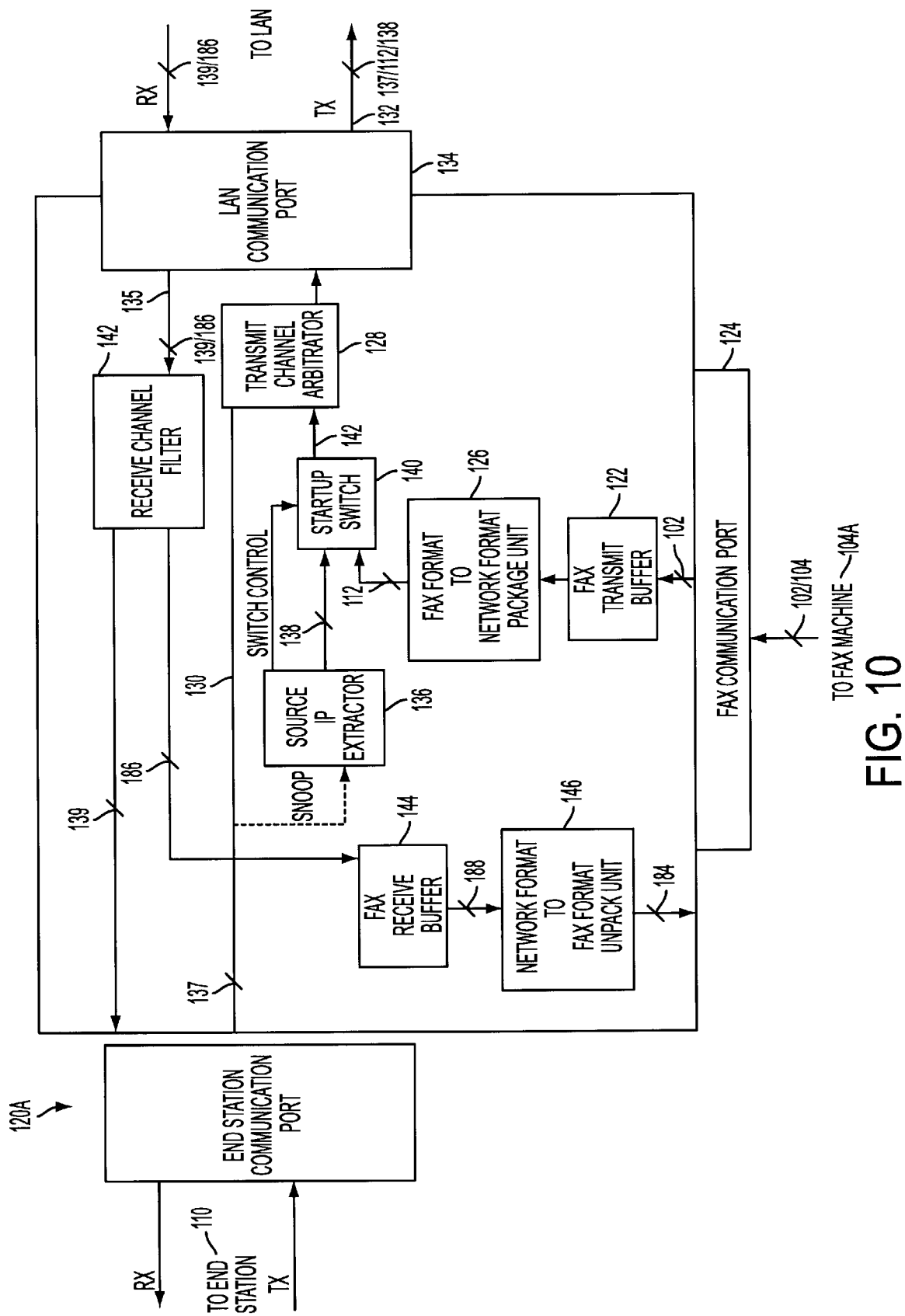
FIG. 10 depicts the first converter according to an exemplary embodiment of the invention shown in a send and receive configuration.

FIG. 10 depicts another form of the first converter 120A, shown generally in FIG. 6, wherein the sender FAX machine 104A is further configured to also receive FAX communications 184 utilizing both a start-up mode and an operation mode. The first converter 120A further includes a source IP extractor 136 that detects and extracts the sender IP address by monitoring a transmit channel 130 for network packets 137 transmitted by the sender side LAN end station 110. Once the sender IP address is determined, the source IP extractor 136 generates a notification packet 138 including the predefined session port number in a header of the notification packet 138, the sender FAX-network ID and the extracted sender IP address. A startup switch 140 receives the notification packet 138 and the FAX packet 112, such that once the notification packet 138 is transferred to an output 142 of the startup switch 140, the FAX packet 112 is transferred to the output 142 thereafter.

Until the notification packet 138 is transferred to the output 142 of the startup switch 140, the first converter 120A is in start-up mode. During start-up mode, the FAX-network ID and the sender side LAN end station IP address are not registered with the FAX-network server 150. Consequently, the converter 120A is unable to receive or send FAX communications 102 from or through the FAX-through data network 100. Once the notification packet 138 is transmitted to the FAX-network server 150, the converter 120A enters operation mode. During operation mode, the FAX-network ID and the corresponding IP address of the first converter 1 20A are registered in the FAX-network server 150, thereby enabling the receipt or transmission of FAX communications through the FAX-through data network 100.

The transmit channel arbitrator 128 monitors the sender side end station transmit channel 130. Once the sender side end station transmit channel 130 is idle, the notification packet 138 is transferred to the FAX-network server 150 via the transmit channel 132 of the LAN communication port 134. The sender FAX 104 then enters operation mode allowing the sender FAX 104 to receive FAX communications 184. A receive channel filter 142 monitors a sender side end station receive channel 135 for network packets 139/186 transmitted to the sender side end station 170. A session port number and a source IP address of the network packets 139/186 are then analyzed in order to identify and intercept a FAX packet 186. A network packet 139/186 transmitted to the LAN end station 110 is identified as a FAX packet 186 when the session port number matches the predefined session port number and the source IP address matches an IP address of the FAX-network server 150. A FAX receive buffer 144 stores the FAX packet 186 once it is identified and intercepted. A network format to FAX format unpack unit 146 then extracts the FAX communication 184 from the FAX packet 186 and forwards the FAX communication 184 to the sender FAX machine 104A via the FAX communication port 124. The FAX communication port 124 establishes a communication channel with the sender FAX machine 104A without routing a signal through the PSTN by using a PBX emulation device (not shown) as known in the art.

Figure 11:
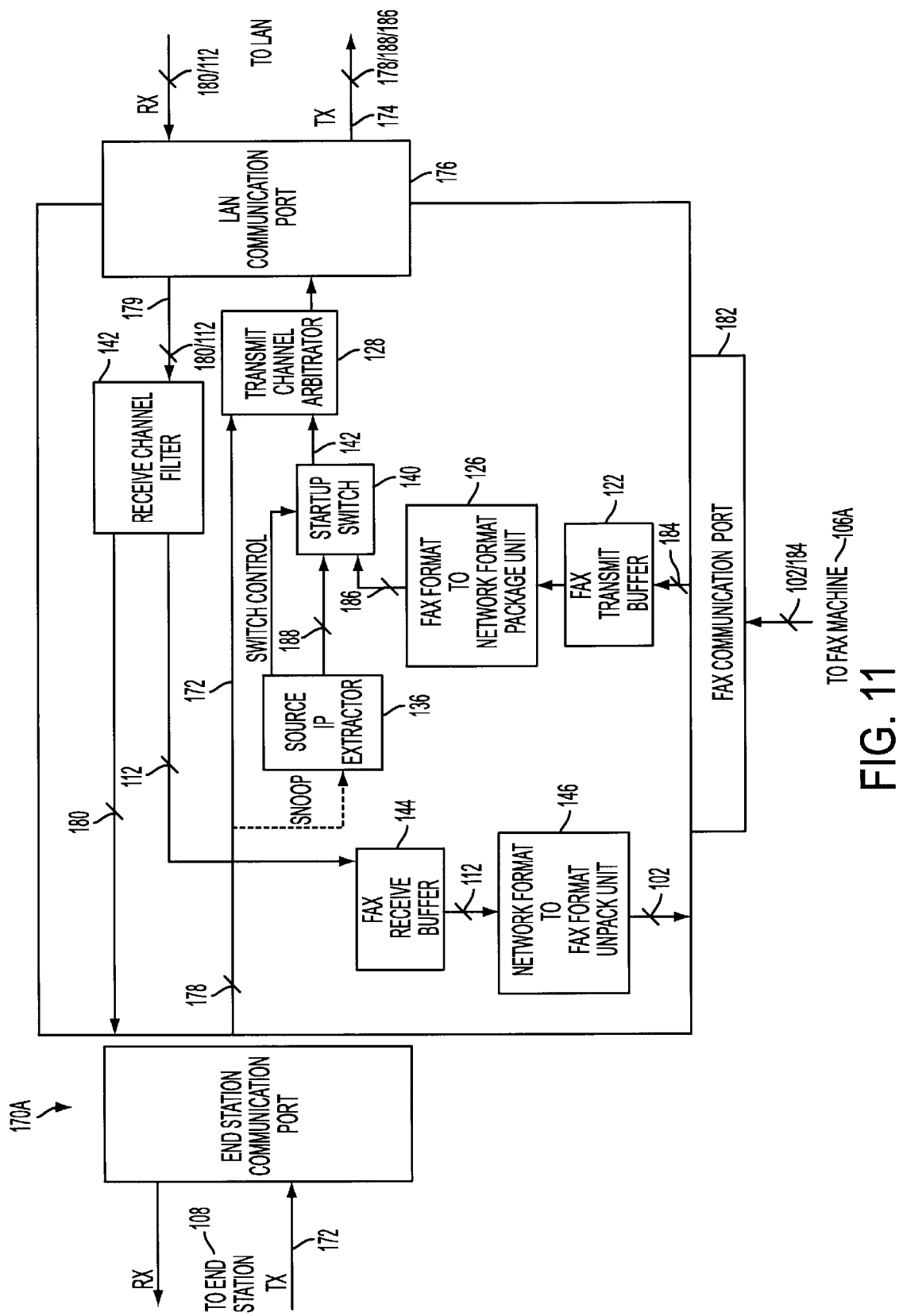
FIG. 11 depicts the second converter according to an exemplary embodiment of the invention shown in a send and receive configuration.

FIG. 11 depicts the second converter 170A according to another embodiment of the invention wherein the receiver FAX machine 106A is further configured to also transmit FAX communications 184, utilizing both a startup mode and an operation mode. The second converter further includes a startup switch 140 that receives the notification packet 188 and a FAX packet 186. Once the notification packet 188 is transferred to an output 142 of the startup switch 140, the second converter enters operation mode, thereby transferring the FAX packet 186 to the output 142 thereafter. During operation mode, the FAX communication port 182 establishes a communication with the receiver FAX machine 106 without routing a signal through the PSTN as described above. A FAX transmit buffer 122 then stores the FAX communication 184 received from the receiver FAX 106A via the FAX communication port 182 transmit buffer 122. A FAX to network package unit 126 then retrieves the FAX communication 184 from the FAX transmit buffer 122 and converts the FAX communication 184 to generate the FAX packet 186. The FAX packet 186 includes the predefined session port number in a header of the FAX packet 186 and the destination FAX-network ID for identification purposes. In order for the receiver FAX machine 106A to also transmit FAX communication 184, the transmit channel arbitrator 128 further monitors the receiver side end station transmit channel 172. Once the transmit channel 172 is idle, the notification packet/FAX packet 188/186 is transferred to the FAX-network server 150 via the transmit channel 174 of the LAN communication port 176.

The FAX-through data network 100, is preferably configured such that the first convert 120 and the second converter 170 both send and receive FAX communications 102/184 as depicted in FIGS. 10 and 11, respectively. However, it is within the contemplation of the present invention to configure the first converter 120 and the second converter 170 as depicted in FIGS. 7 and 9, respectively. Such a configuration would require a first converter 120 and a second converter 170, attached to each FAX machine 104/106. The first converter 120 would be configured in the "send only" mode, while the second convert 170 would be configured in the "receive only" mode as described above. Thereby, each FAX machine 104/106 could either send or receive the FAX communication 102/184 without routing a signal through the PSTN and also shares the IP address of its corresponding LAN end station 108/110.

B. Operation

Figure 12:
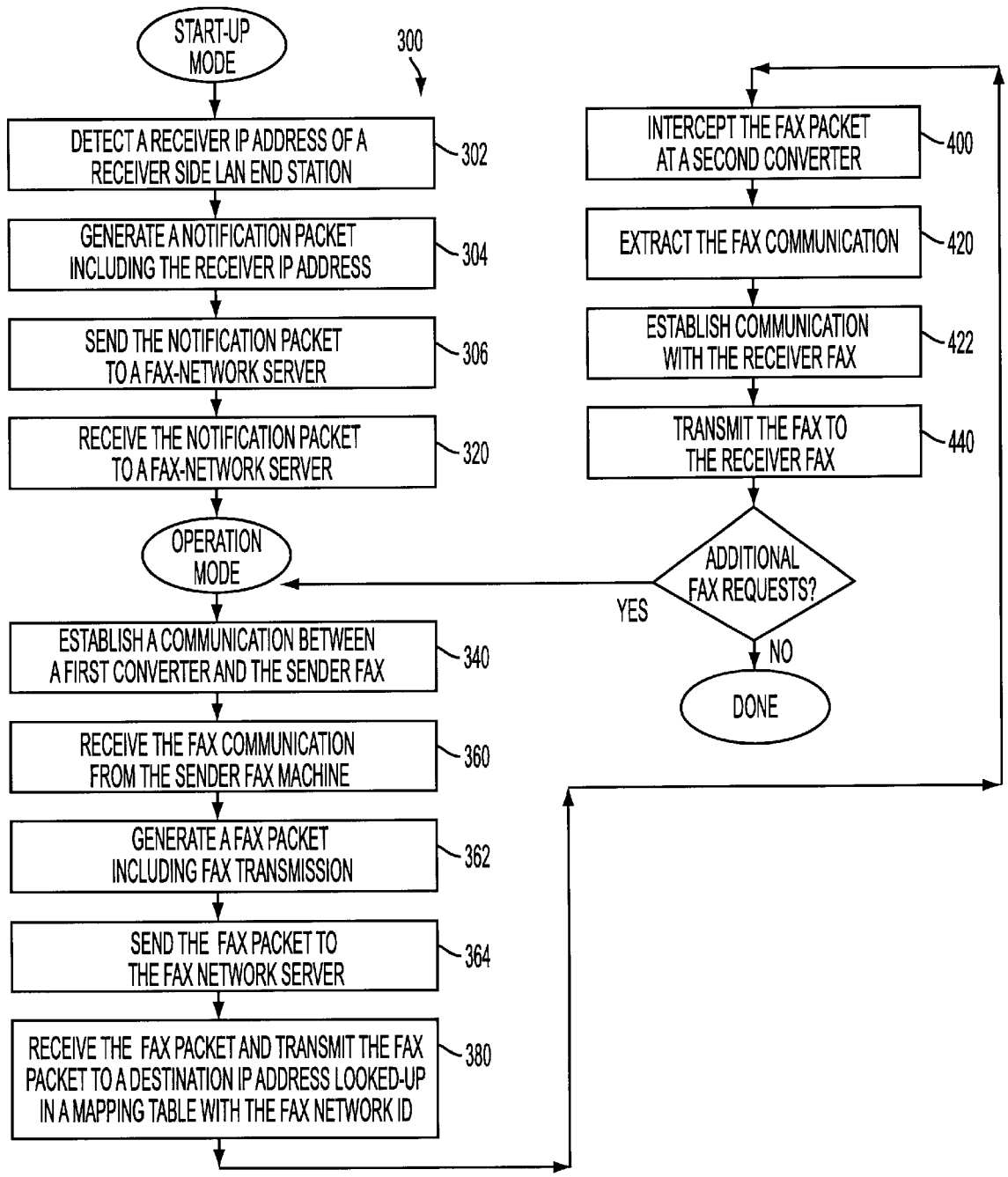
FIG. 12 depicts method steps for transmitting a FAX communication from a sender FAX to a receiver according to an embodiment of the invention.

FIG. 12 depicts a procedure 300 of a first embodiment for transmitting a FAX communication 102 from a sender FAX 104 to a receiver FAX 106 utilizing a FAX-through data network 100 without routing a signal through a PSTN, for example, as depicted in FIGS. 6 and 8. The FAX-through data network 100 functions in a start-up mode and an operation mode. The FAX-through data network 100 at step 302 begins in startup mode, wherein a receiver IP address of a receiver side LAN end station 108 is detected. At step 304, a notification packet 188 including a predefined session port number, the detected receiver IP address and a receiver FAX-network ID is generated. At step 306, the notification packet 188 is sent to a FAX-network server 150. At step 320, the notification packet 188 is received at the FAX-network server 150, wherein the FAX-network server 150 includes a mapping table 160 between the destination FAX-network ID and the destination IP address. The FAX-network ID and corresponding IP address contained in the notification packet 188 are added to the mapping table 160 in order to enable the transmission of the FAX communications 102 between the sender FAX 104 and the receiver FAX 106.

Operation mode begins at step 340, wherein a communication link is established between a first converter 120 and the sender FAX 104 without routing a signal through a PSTN. At step 360, the FAX communication 102 is received from the sender FAX 104 at the first converter 120. At step 362, a FAX packet 112 is generated by converting the FAX communication 102 to a network packet format including the predefined session port number and the receiver FAX-network ID. At step 364, the FAX packet 112 is sent to the FAX-network server 150. At step 380, the FAX packet 112 is received by the FAX-network server 150 and re-transmitted to a destination IP address. However, the destination IP address is first looked-up in the mapping table 160, using the receiver FAX-network ID as a key, in order to re-transmit the FAX packet 112 to the destination IP address. At step 400, the FAX packet 112 is intercepted at a second converter 170. At step 420, the FAX communication 102 is extracted from the FAX packet 112. At step 422, a communication link is established with the receiver FAX machine 106 without routing a signal through a PSTN. Finally at step 440, the FAX communication 102 is transmitted to the receiver FAX 106. Steps 340 through 440 are repeated during the operation mode of the FAX-through data network 100 for each transmission of the FAX communication 102.

Figure 13:
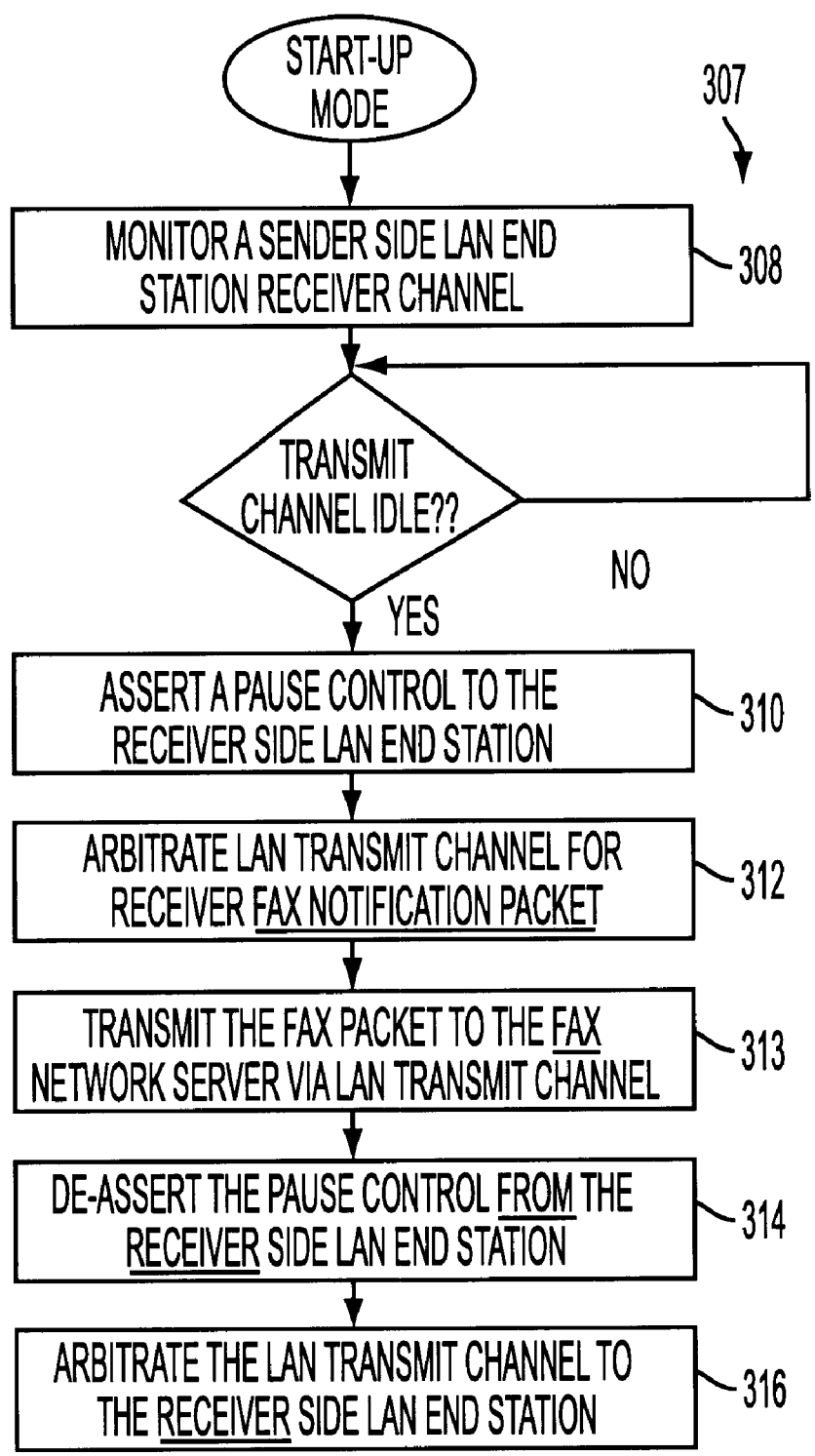
FIG. 13 depicts additional method steps for sending the notification packet to the network server according to an embodiment of the invention.

FIG. 13 depicts additional procedural method steps 307 for sending the notification packet 188 to the FAX-network server of step 306, for example, from the second converter 170, as depicted in FIGS. 9 and 11. At step 307, a receiver side LAN end station transmit channel 172 is monitored. At step 310, when the transmit channel 172 is idle, a pause control is asserted to the receiver side LAN end station 108. A pause control is a flow control technique as known in the art which has been implemented for the Internet and LAN. At step 312, a LAN transmit channel 174 is arbitrated for sending the notification packet 188. At step 313 the notification packet 188 is transmitted to the FAX-network server 150 via the LAN transmit channel 174. At step 314, the pause control is de-asserted to the receiver side LAN end station 108. Finally at step 316, the LAN transmit channel 174 is arbitrated to the receiver side LAN end station 108.

Figure 14:
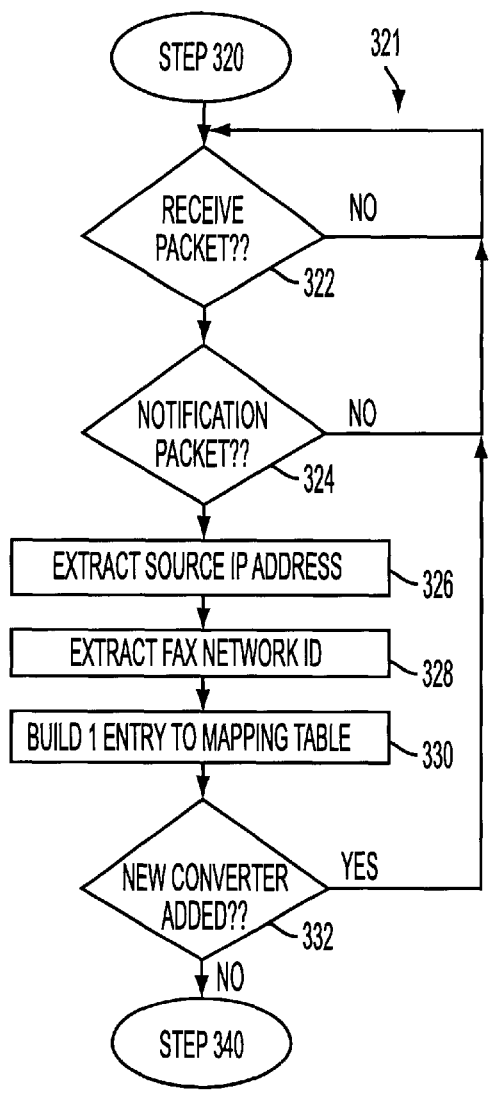
FIG. 14 depicts additional method steps for receiving the notification packet at the FAX-network server according to an embodiment of the invention.

FIG. 14 depicts additional procedural method steps 321 for receiving the notification packet 138/188 at the FAX-network server 150 of step 320, as depicted in FIG. 8, thereby completing the start-up mode. At step 322, a network packet is received from a FAX network server receive channel 154. At step 324, it is determined whether the network packet is a notification packet 138/188. At steps 326 and 328, a source IP address and a source FAX-network ID are extracted from the notification packet 138/188. At step 330, a new entry is created in the mapping table 160 including the source FAX-network ID and the source IP address. Finally at step 332, these steps are repeated for each new sender/receiver FAX 108/110 that is added to the FAX-through data network apparatus 100.

Figure 15:
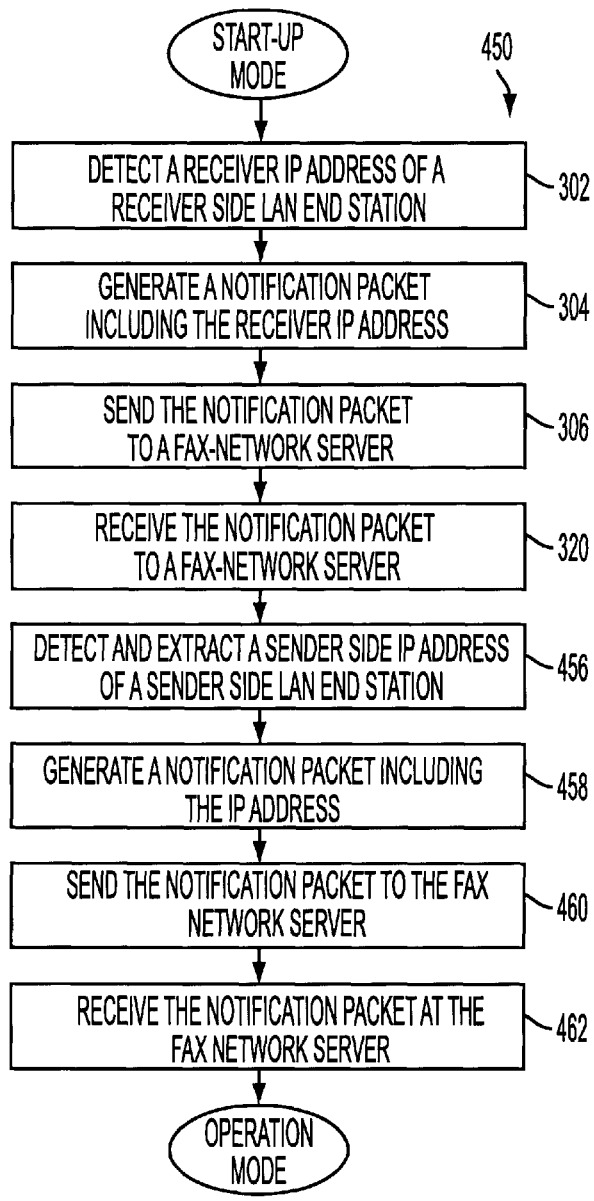
FIG. 15 depicts additional method steps for generating a sender notification packet according to an embodiment of the invention.

FIG. 15 depicts additional procedural method steps 450 of the start-up mode, depicted as steps 302 through 320 in FIG. 12, thereby enabling the transmission of the FAX communication 102 from the receiver FAX 106 to the sender FAX 104, for example, as depicted in FIGS. 6, 8 and 10. Steps 302 through 320 are included in FIG. 15 for the purposes of illustration. At step 456, a sender IP address of the sender side LAN end station 110 is detected and extracted by monitoring a sender side end station receive channel 135 for network packets 139/186 transmitted to the sender side end station 110. At step 458, a notification packet 138 is generated including the predefined session port number in a header of the notification packet 138, the sender IP address and a sender FAX-network ID. At step 460, the notification packet 138 is sent to the FAX-network server 150. Once the notification packet 138 is transmitted to the FAX-network server 150, first converter 120A enters operation mode. Finally, at step 462, the FAX-network server 150 will receive the notification packet 138 and create a new entry in the mapping table 160. The new entry contains the sender FAX-network ID and the sender IP address extracted from the notification packet 138, and enables a FAX communication 184 to be transmitted to the sender FAX 104.

Figures 16, 17:
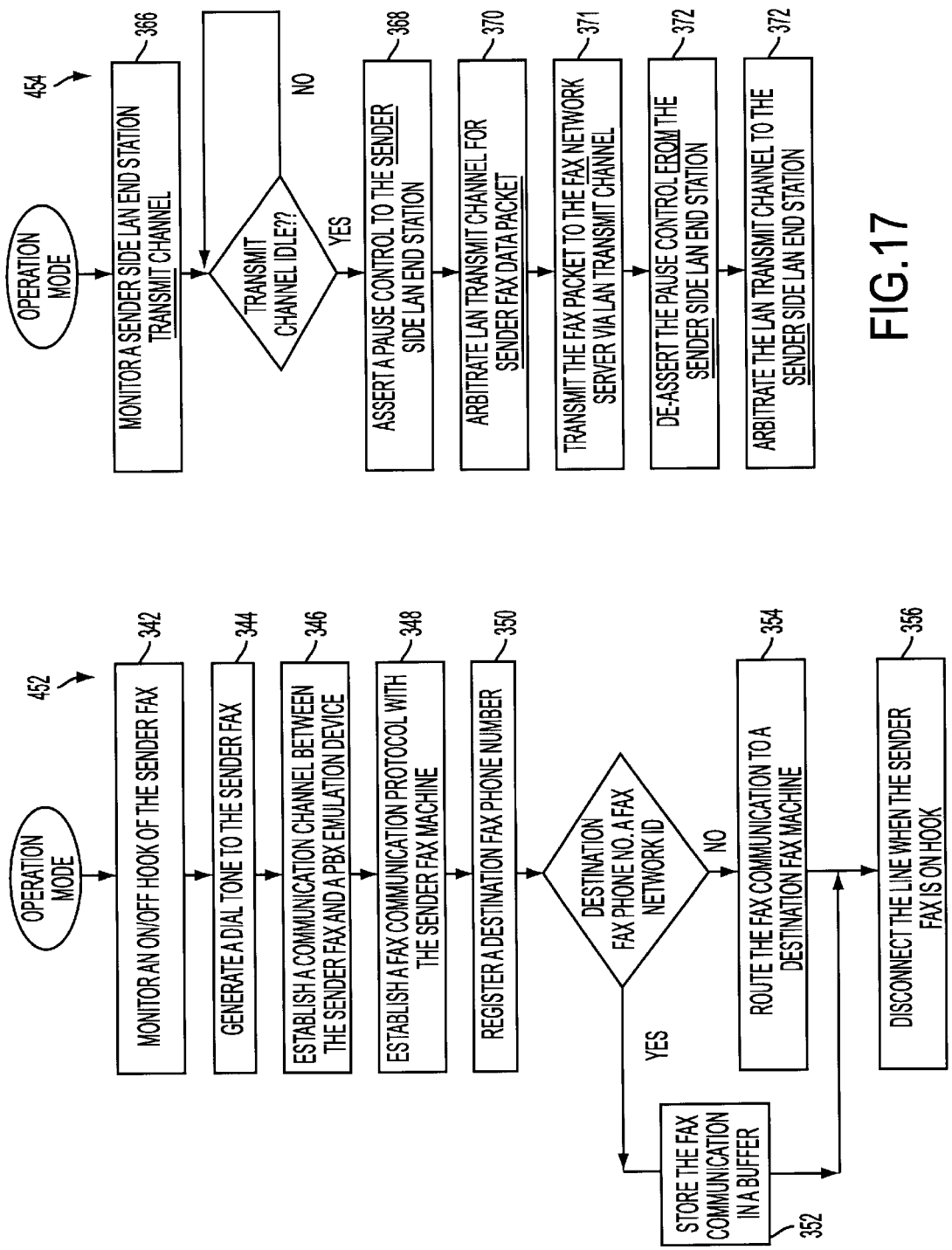
FIG. 16 depicts method steps for establishing a FAX communication between a sender FAX and a first converter according to an embodiment of the invention.
FIG. 17 depicts additional method steps for sending the FAX packet to FAX-network server according to an embodiment of the invention.

FIG. 16 depicts additional procedural method steps 452 for establishing a communication link between the first converter 120 and the sender FAX 104 of step 340, as depicted in FIG. 7. At step 342, an on/off hook of the sender FAX machine 104 is monitored. At step 344, a dial tone is generated to the sender FAX machine 104. At step 346, a communication channel is established between the sender FAX machine 104 and a PBX emulation device (not shown). At step 348, a FAX communication protocol is established with the sender FAX machine 104. At step 350, a destination FAX telephone number is registered to determine whether the destination FAX phone number is a FAX-network ID. At step 352, when the destination FAX phone number is a FAX-network ID, the FAX communication 102 is stored in a FAX transmit buffer 122. At step 354, when the destination FAX phone number is a FAX phone number, the FAX communication 102 is routed to the destination FAX machine via the PSTN. Finally at step 356, the line is disconnected when the sender FAX machine 104 is on hook.

FIG. 17 depicts additional procedural method steps 454 for sending the FAX packet 112 to the FAX-network server 150 of step 364, for example, in the first converter 120, as depicted in FIGS. 7 and 10. At step 366, a sender side LAN end station transmit channel 130 is monitored. At step 368, when the transmit channel is idle 130, a pause control is asserted to the sender side LAN end station 110. At step 370, a LAN transmit channel 132 is arbitrated for sending the FAX packet 112. At step 371 the FAX packet 112 is transmitted to the FAX-network server 150 via the LAN transmit channel 132. At step 372, the pause control is de-asserted to the sender side LAN end station 110. Finally at step 374, the LAN transmit channel 132 is arbitrated to the sender side LAN end station 110.

Figure 18:
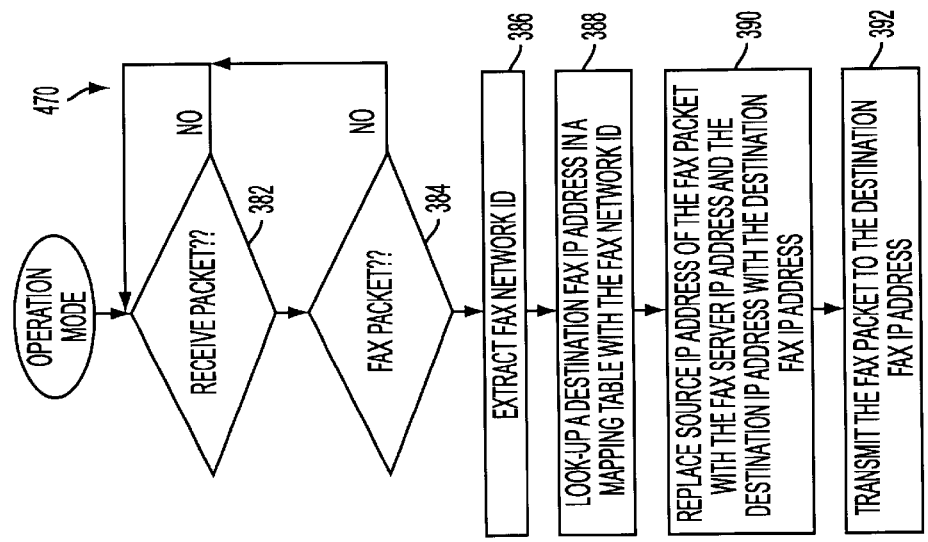
FIG. 18 depicts additional method steps for receiving the FAX packet at the FAX-network server according to an embodiment of the invention.

FIG. 18 depicts additional procedure method steps 470 for receiving the FAX packet 112/186 at the FAX-network server 150 and transmitting FAX packet 112/186 to the destination IP address of step 380, as depicted in FIG. 8. At step 382, a network packet, transmitted to the FAX-network server 150, is received on a server receive channel 154. At step 384, an input filter 152 determines whether the network packet is a FAX packet 112/186. At step 386, a second extractor 162 extracts the destination FAX-network ID from the FAX packet 112/186. At step 388, a search engine 164 determines the destination FAX IP address from the mapping table 160 by using the destination FAX-network ID received from the second extractor 162 as a key. At step 390, a packet modifier 166 then modifies a destination IP address and a source IP address in a header of the FAX packet 112/186. The packet modifier 166 replaces the destination IP address of the FAX packet 112/186 with the destination FAX IP address and the source IP address of the FAX packet 112/186 with an IP address the FAX-network server 150. Finally at step 392, the FAX packet 112/186 is transmitted to the destination IP address.

Figure 19:
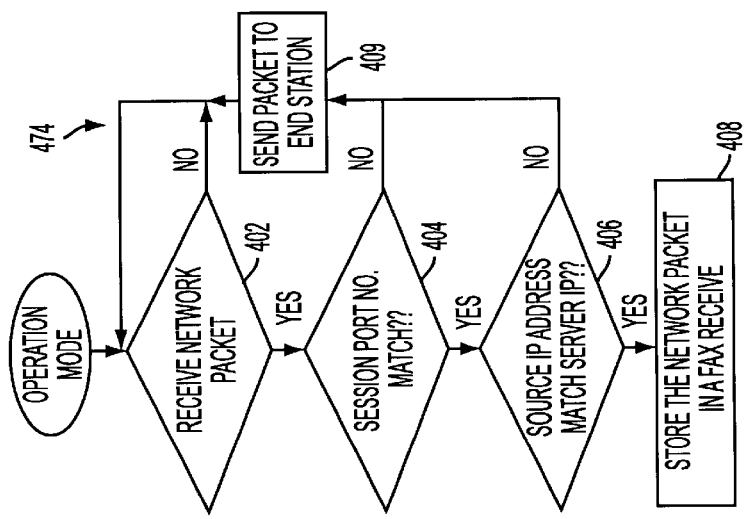
FIG. 19 depicts additional method steps for intercepting the FAX packet at a second converter according to an embodiment of the invention.

FIG. 19 depicts additional procedural method steps 474 for intercepting the FAX packet 112 of step 400, for example, in the second converter 170, as depicted in FIG. 9. At step 402, a network packet 180/112 is received on a receive channel 179 of the receiver side LAN end station 108. At steps 404 and 406, a session port number and a source address of the network packet 180 are analyzed. Finally at step 408, when the session port number equals the predetermined session port number and the source address matches the FAX-network server IP address, the network packet 180/112 is identified as a FAX packet 112 and is stored in the FAX receive buffer 144. Otherwise at step 409, the network packet 180 is transmitted to the LAN end station 108.

Figure 20:
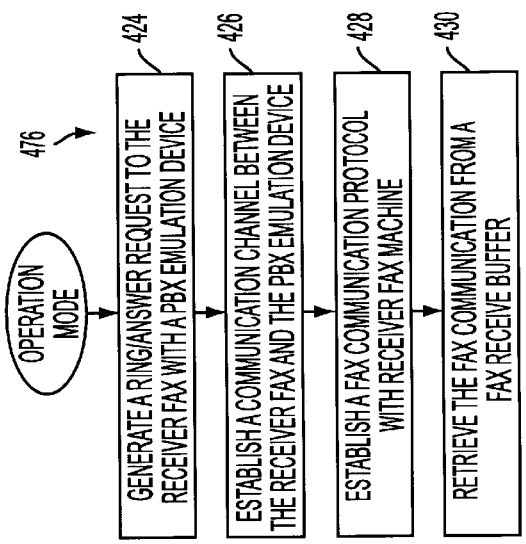
FIG. 20 depicts additional method steps for establishing a FAX communication with the receiver according to an embodiment of the invention.

FIG. 20 depicts additional procedural method steps 476 for establishing a communication link with the receiver FAX 106 of step 422, for example, in the second converter 170, as depicted in FIG. 9. At step 424, a ring/answer request is generated to the receiver FAX machine 106 with a PBX emulation device (not shown). At step 426, a communication channel is established between the receiver FAX 106 and the PBX emulation device (not shown). At step 428, a FAX communication protocol is established with the receiver FAX 106. Finally at step 430, the FAX packet 112 is retrieved from a FAX received buffer 144, and the FAX communication 102 is extracted.

Figure 21:
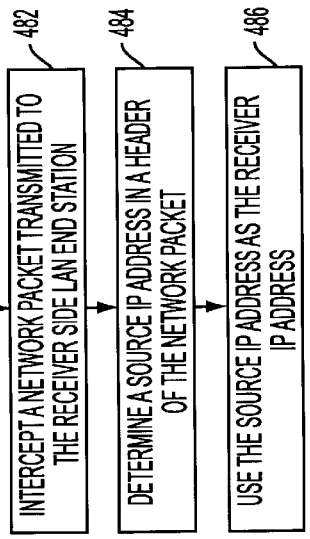
FIG. 21 depicts additional method steps for detecting a receiver IP address according to an embodiment of the invention.
Figure 23:
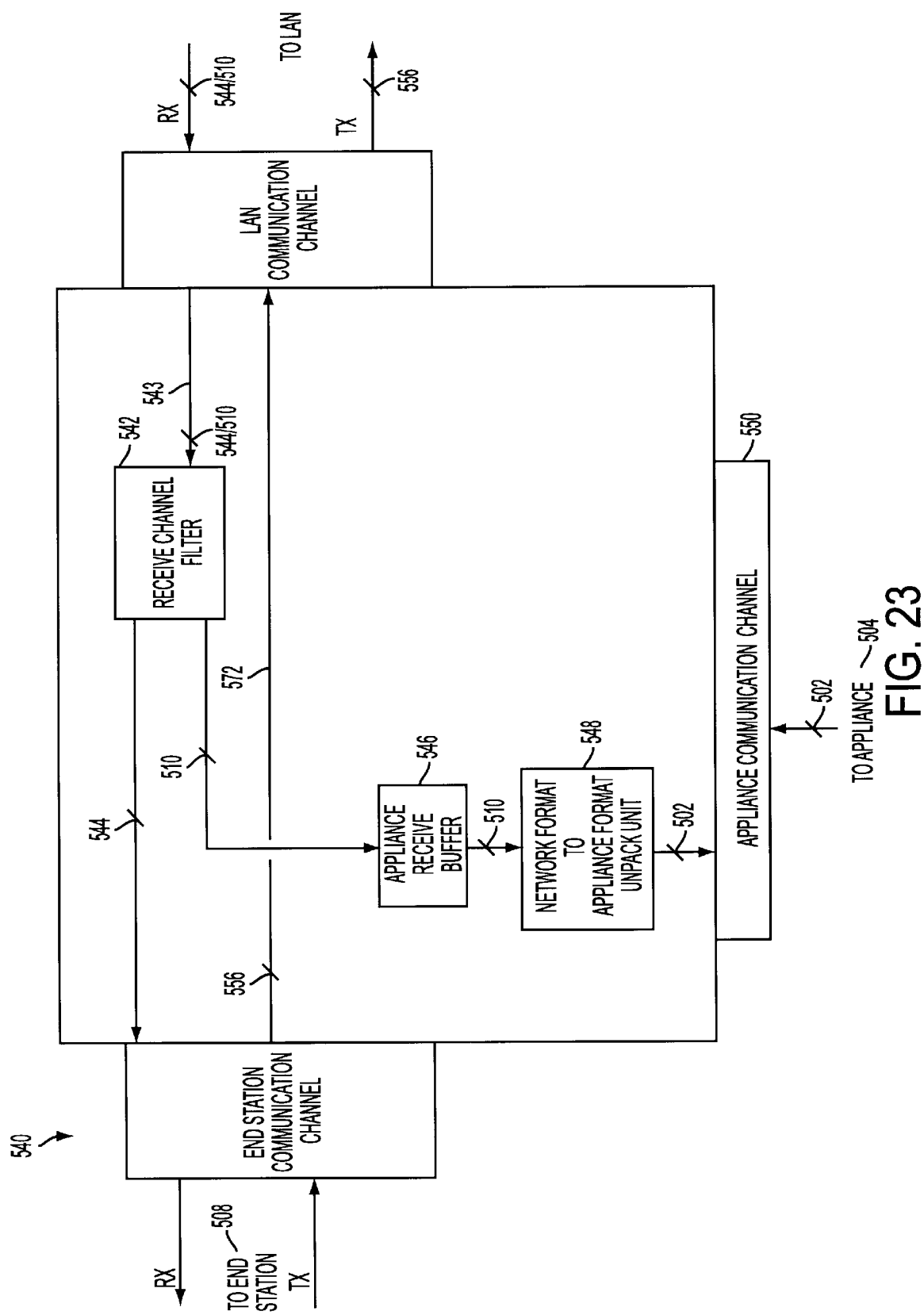
FIG. 23 depicts an appliance converter according to an embodiment of the invention.

FIG. 21 depicts additional procedural method steps 480 of the start-up mode for detecting the receiver IP address of step 302, for example, in the receiver converter 540, as depicted in FIG. 23. At step 482, a transmit channel 572 is monitored for network packets 556 transmitted by the receiver side LAN end station 508. At step 484, a source IP address in a header of the network packet 556 is detected and extracted. Finally at step 486, the source IP address is used as the receiver IP address.

2. Remote Access Appliance Control Apparatus

The IP Sharing method utilized by the FAX-through data network described above is not limited to the transmission of FAX communications. The protocol used by the FAX communication port of the converter can be modified to utilize other established or new protocols to enable connections to any device. The method of learning the IP address of a LAN end station and sharing it with an attached device is the same. This sharing mechanism conserves network resources and reduces network management effort.

For example, an appliance could be attached to the communication port of an appliance converter. Each appliance, such as a VCR, a TV, an air conditioner, a security alarm, or a lighting system will use an established or user defined communication protocol to control the power on/off, volume high/low, or other functional adjustments from a user through the data network. This protocol is most useful but is not limited to receiving control commands from a "REMOTE" network user. The use of a network server and notification packets enables the remote access control of the appliance as described for the FAX-through data network. The invention can also be used to transfer status reports generated by the appliance to the remote network user.

The appliance can send status report either autonomously and periodically to the remote network user, or on request basis in response to a command control packet sent from the user. The status reports may contain user defined items such as temperature reading and a video snapshot. The appliance is responsible for generating the status report, and packaging the status report with the user defined appliance communication protocol, and sending the report to the appliance converter.

In addition, an end station IP address can be further shared by multiple appliance converters in a daisy chain configuration. All the appliance converters in one chain share not only the IP address, but also the network administration resources with a LAN end station. This results in a significant reduction of the limited network administration resources.

To describe the daisy chain configuration the following terminology is introduced: a "First" converter in the chain is the converter directly connected to the end station while the "Last" converter in the chain is directly connected to the LAN with additional converters therebetween. When a converter wants to send either a notification packet (as described above), or an appliance status report packet (status report in a network packet format), it needs to detect an idle state in the transmit channel of the previous stage converter or end station (for the "First" converter) before it transmits the notification/status packet out to the LAN port. However, the converter is required to use a LAN Pause Control to stop the end station or previous stage converter from sending any packets to the transmission channel during that period.

Due to this requirement, each converter needs to provide two functions to enable the daisy chain to configuration work. First, each converter is required to accept the pause control protocol from the next converter or LAN connection (for the last converter). Upon receiving this pause control command, the converter will stop any transmission to LAN channel until the pause command is relinquished. Second, the Pause control needs to be sent back to the previous stage converter or the end station(for the first converter). This backward propagation of the pause control can stop all the transmissions from the previous stage. This second requirement is not unique to daisy chain configuration; both the single appliance configuration and FAX-through data network are required to accept a pause control from the LAN channel and forward back the pause control to the previous stage.

It should be noted that the IP sharing mechanism not only shares the IP address but also shares the network bandwidth with an end station. Therefore, latency is induced when the end station is busy. In the daisy chain configuration, the condition may be aggravated since more than two parties are sharing the communication channel bandwidth. Therefore, appliances using the IP sharing mechanism should be limited to non-real time applications. For example, application such as voice conversations are not applicable, since they require a very stringent real time response.

A. System Architecture

A first embodiment is described with reference to FIG. 22. An appliance control apparatus 500, for asserting a control command 502 to an appliance 504 from a remote network user 506 using an appliance communication protocol, is depicted. The apparatus 500 includes an appliance side LAN end station 508 having an appliance IP address which is shared by an appliance converter 540. An appliance control packet 510 is generated by the remote network user 506 and includes a predefined session port number, an appliance network ID and the control command 502. An appliance network server 520 receives the appliance control packet 510, extracts the appliance network ID, looks-up a corresponding destination IP address in a mapping table (not shown), and forwards the appliance control packet 510 to the destination IP address. An appliance converter 540 intercepts and identifies the appliance control packet 510, extracts the control command 502 and asserts the control command 502 to the appliance 504 using the appliance communication protocol.

FIG. 23 depicts the appliance converter 540 according to an embodiment of the invention 500. The appliance converter 540 includes a receive channel filter 542 that monitors an appliance converter receive channel 543 for network packets 544/510 transmitted to the appliance side LAN end station 508. In order to identify and intercept the appliance control packet 510, a session port number of the network packet 544/510 must match the predefined session port number and a source IP address of the network packet 544/510 must match an IP address of the appliance network server 520. Once identified, the appliance control packet 510 is stored in an appliance receive buffer 546. A network format to appliance format unpack unit 548 then extracts the control command 502 from the appliance control packet 510 and forwards the control command 502 to the appliance 504 via an appliance communication port 550. The appliance communication port 550 establishes the appliance communication protocol with the appliance 504 to assert the control command 502.

The appliance communication protocol between the appliance converter 510 and the appliance 504 is user defined. There are several standard communication protocols for a user to choose from such as RS232 (serial interface), Centronics bus (Parallel interface), I2C (mini control interface), including several others. The user can choose to define their own proprietary communication interface as well. Details regarding the communication interface will be apparent to those skilled in the art of appliances and are therefore not further described.

Figure 24:
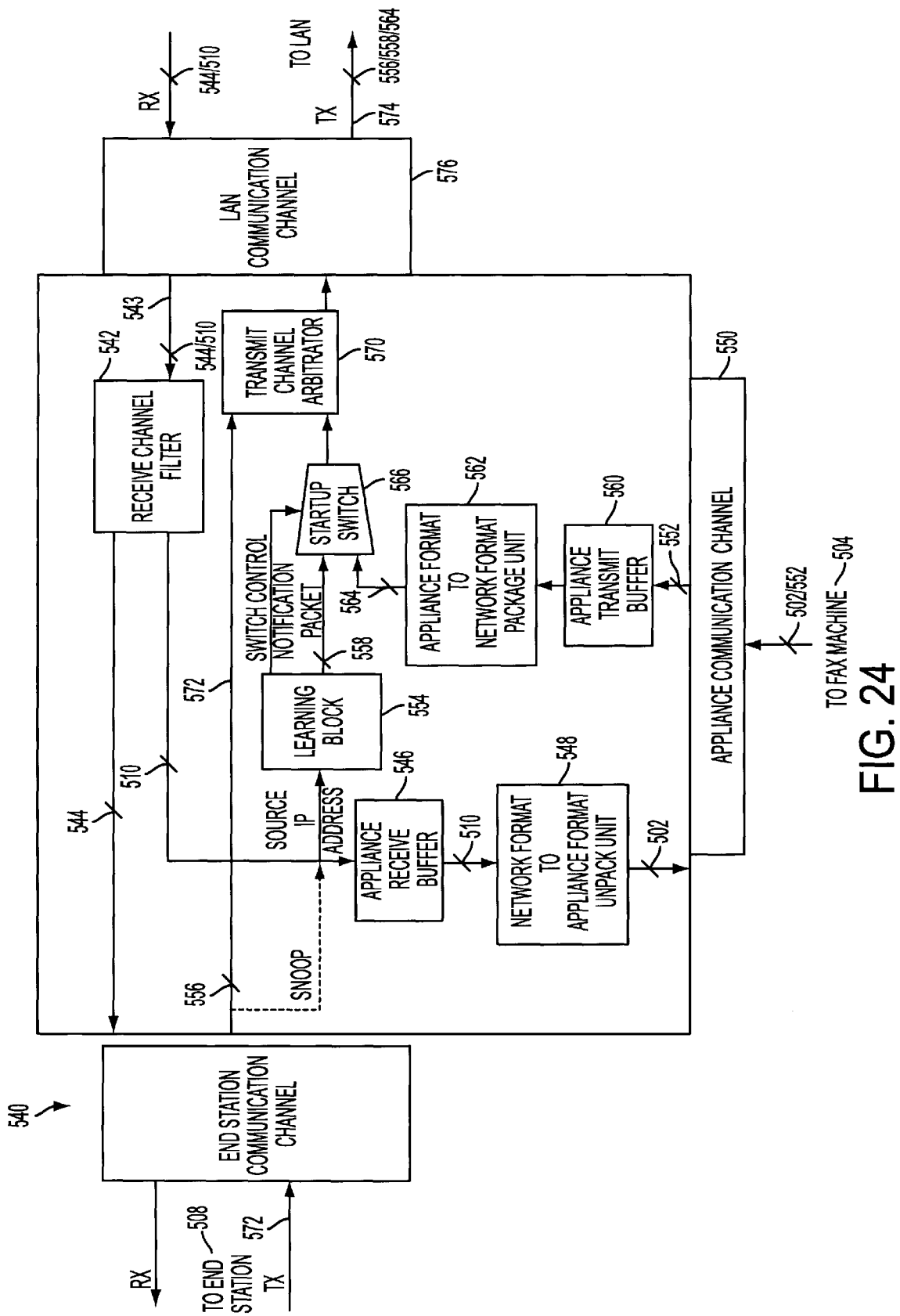
FIG. 24 depicts the appliance converter according to an exemplary embodiment of the invention.

FIG. 24 depicts an exemplary embodiment of the remote appliance control apparatus 500, wherein the appliance 504 is further configured to also generate a status report 552 utilizing both a start-up mode and an operation mode. The appliance converter 540 further includes a source IP extractor 554 configured to detect and extract the appliance IP address by monitoring a transmit channel 572 for network packets 556 transmitted by the appliance side LAN end station 508. Once the appliance IP address is determined, the source IP extractor 554 generates a notification packet 558 including the predefined session port number in a header of the notification packet 558, the appliance network ID and the appliance IP address. A startup switch 566 receives the notification packet 558 and transfers the notification packet 558 to an output 568 of the startup switch 566.

Until the notification packet 558 is transferred to the output 568 of the startup switch 140, the appliance converter 540 is in start-up mode. During start-up mode, the appliance network ID and the appliance IP address are not registered with the appliance network server 520. Consequently, the appliance converter 540 is unable to receive appliance control packets 510 from the remote network user 506. Once the notification packet 558 is transmitted to the appliance network server 520, the appliance converter 540 enters operation mode. During operation mode, the FAX-network ID and the corresponding IP address of the appliance converter 540 are registered in a mapping table 530 of the appliance network server 520, thereby enabling the receipt of appliance control packets 510 through the appliance control apparatus 500.

A transmit channel arbitrator 570 monitors an appliance side end station transmit channel 572. Once the transmit channel 572 is idle the notification packet 558 is transferred to the appliance network server 520 via a transmit channel 574 of a LAN communication port 576. The appliance converter 504 then enters operation mode allowing the appliance 504 to receive control commands 502. However, this embodiment requires the remote network user 506 to generate a user notification packet 580 before the status report can be generated. The user notification packet 580, includes the predefined session port number in a header of the user notification packet 580, a user network ID and a user IP address. The user notification packet 580 is then sent to the appliance network server 520. Once the user notification packet is received at the appliance network server 520, an entry in the mapping table 530 (FIG. 24) is created including the user network ID and the user IP address. The appliance control apparatus can then allow the appliance 504 to receive control commands 502 and transmit status reports 552 to the remote network user 506.

During operation mode, the appliance control apparatus is able to receive appliance control packets 510 and also generates status reports 554. In order for the appliance control apparatus 500 to provide status reports 554, an appliance transmit buffer 560 stores the status report 552 received from the appliance 504 via the appliance communication port 550. The appliance communication port 550 establishes a communication link with the appliance 504 using the appliance communication protocol as described above. An appliance to network package unit 562 then receives the status report 552 and converts the status report 552 to the network packet format to generate a status report packet 564. The status report packet 564 includes the predefined session port number in an identification field of the status report packet 564 and a user network ID of the remote network user 506.

The startup switch 566 receives both the notification packet 558 and the status report packet 564. Once the notification packet 558 is transferred to an output 568 of the startup switch 566, the status report packet 564 is transferred to the output 568 thereafter. The transmit channel arbitrator 570 then monitors an appliance side end station transmit channel 572, such that once the transmit channel 572 is idle the notification packet/status report packet 558/564 is transferred to the appliance network server 520 via a transmit channel 574 of a LAN communication port 576. While the transmit channel arbitrator 570 is transmitting the notification packet 558 or status report packet 564, a pause control command is asserted to end station 508 to stop it from transmitting network packets 556. Once transmission of the notification packet 558 or the status report packet 564 is finished, the pause control command is de-asserted to enable the end station to transmit the network packets 556.

Figure 25:
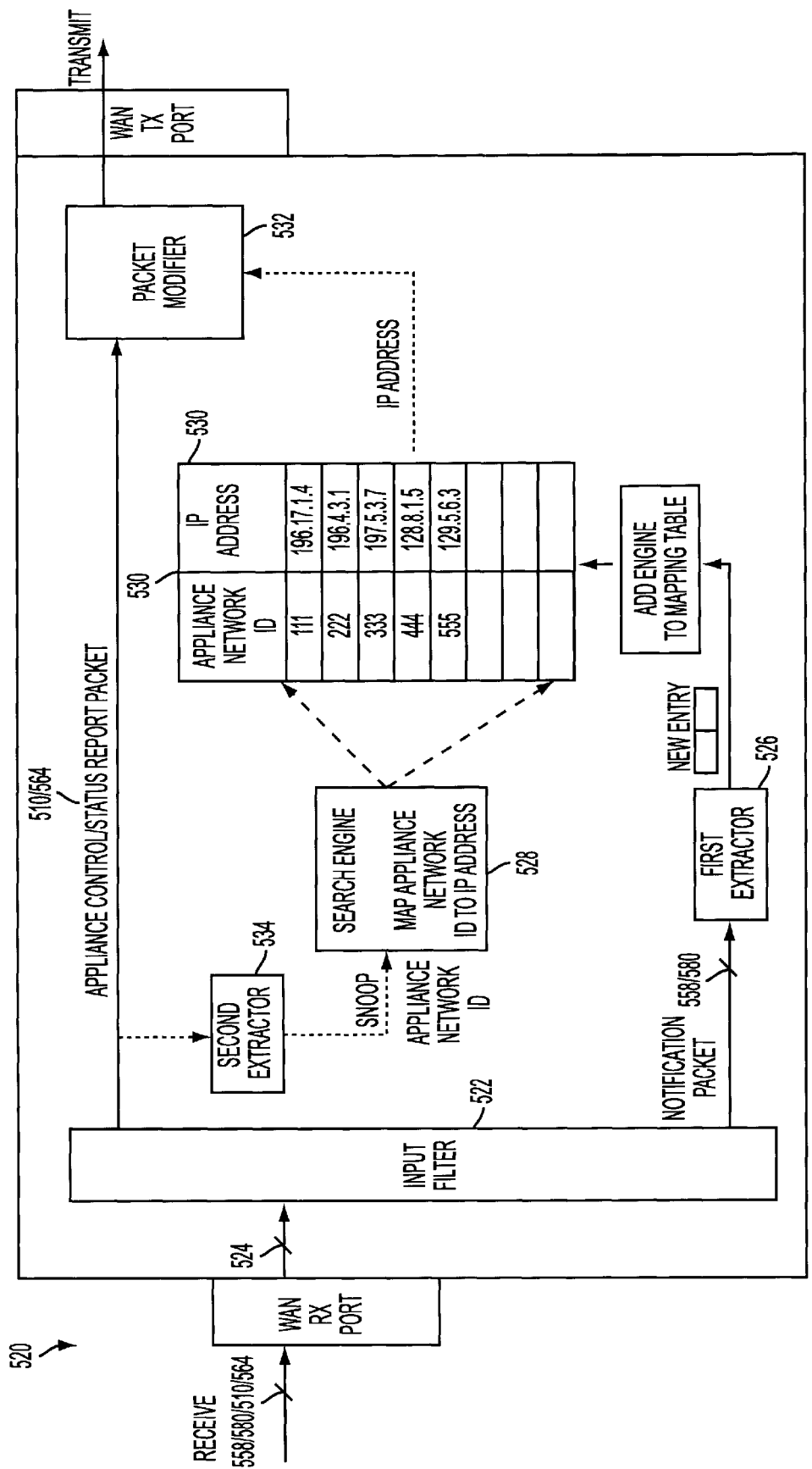
FIG. 25 depicts an appliance network server according to an embodiment of the invention.

FIG. 25 depicts the appliance network server 520 according to an embodiment of the invention 500. The appliance network server 520 includes an input filter 522 that monitors a server receive channel 524 for network packets transmitted to the appliance network server 520. The input filter 552 identifies whether a received network packet is a notification packet 558/580, a status report packet 564 or an appliance control packet 510 based on an identification field of the network packet received. When a notification packet 558/580 is identified, a first extractor 526 determines a network ID and an IP address contained in the notification packet 558/580 to create a new entry in the mapping table 530. When an appliance control packet 510 or a status report packet 564 is identified, a second extractor 534 determines a destination network ID from the appliance control/status report packet 510/564. A search engine 528 then determines a destination IP address from the mapping table 530 using the destination network ID as a key. A packet modifier 532 then replaces a destination IP address in the appliance control/status report packet 510/564 with the destination IP address and a source IP address in the appliance control/status report packet 510/564 with an IP address the application network server 520.

Figure 26:
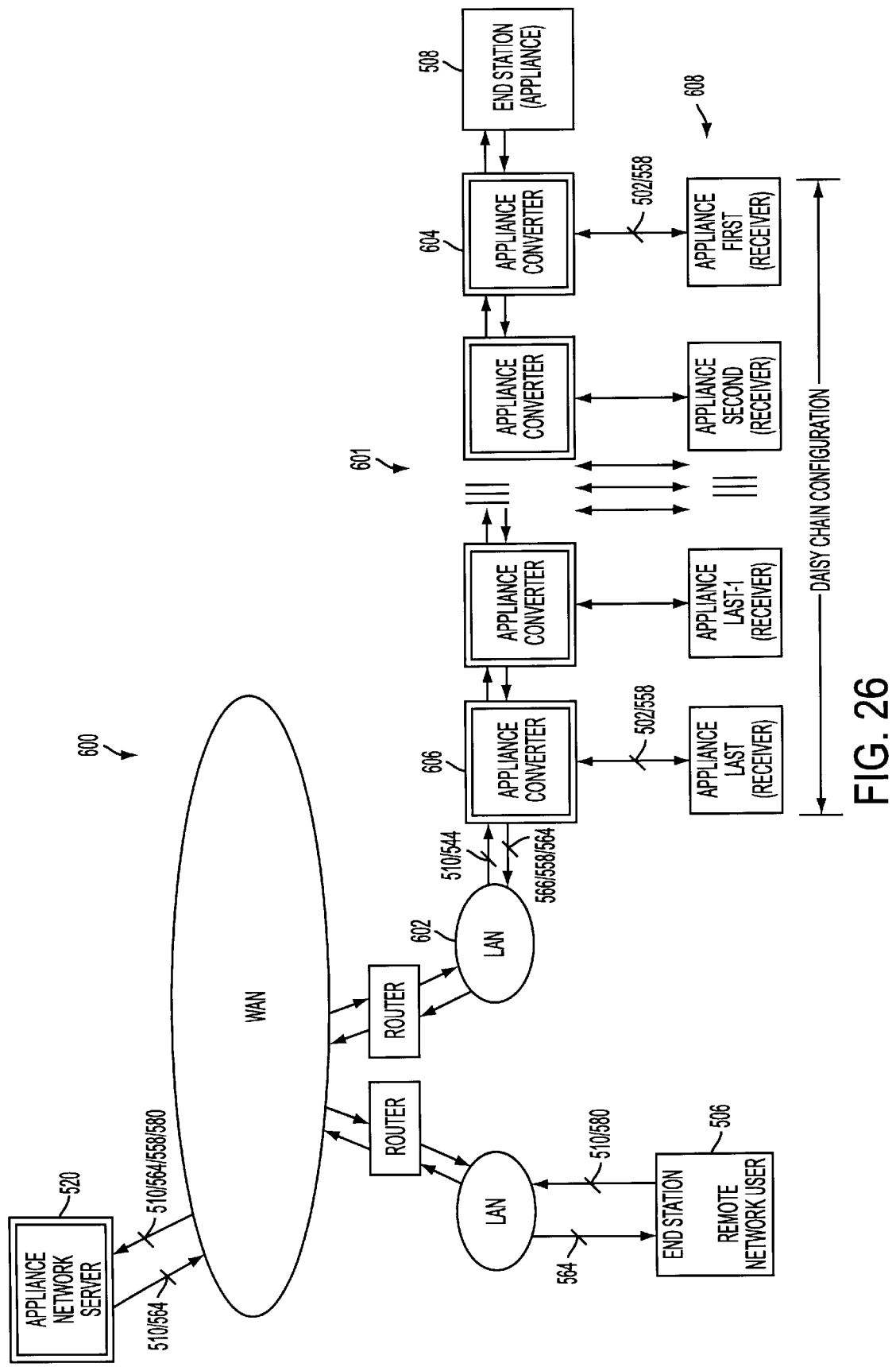
FIG. 26 depicts a daisy chain configuration of the remote access appliance control apparatus according to an alternative embodiment of the invention.

FIG. 26 depicts an alternative configuration of the appliance control apparatus 500 according to an exemplary embodiment of the invention for implementing a daisy chain configuration 600 of the appliance converters 540. The appliance control apparatus 600 includes a plurality of appliance converters 601 arranged in a daisy chain configuration between a LAN 602 and the appliance side LAN end station 508. The following terminology of a first converter 604 and a last converter 606 is provided to illustrate the daisy chain configuration 600: the first converter 604 is directly connected to the appliance side LAN end station and the last converter 606 directly connected to the LAN. A plurality of appliances 608 are each attached to one of the plurality of appliance converters 601, such that each appliance converter 540 has an attached appliance 504.

The interception and identification of the appliance control packet 510 begins with the last converter 606 and continues for each of the plurality of appliance converters 601 until the first converter 604 is reached, such that the plurality of converters 601 are further configured to match the appliance network ID in the appliance control packet 510 with a network ID of the respective appliance converter 601.

In an alternative configuration of the remote access appliance control apparatus 600, each of the appliances can also generate a status report 552. In order to provide the status reports 552, the appliance converters 601 are configured as depicted in FIG. 23, with the exception of the transmit channel arbitrator 570. The transmit channel arbitrator 570 monitors an appliance side end station transmit channel 574. Once the transmit channel 574 is idle, a LAN pause control is issued to the appliance LAN end station 508 and propagate through the plurality of appliance converters 601 until the appliance sides LAN end station 508 is reached. Following assertion of the pause control, the notification packet/status report packet 558/564 is transferred to the appliance network server 520 via the transmit channel 574 of the LAN communication port 576. Once the notification or status report packet 558/564 is sent, the pause control should be de-asserted. The de-assertion of the pause control is issued to the previous stage appliance converter so that the it can begin transmitting network packets 556. De-assertion of the pause control also propagates from the previous stage appliance converter through the plurality of appliance converters 601 until the appliance side LAN end station 508 is reached. This de-assertion of the pause control will revive the transmit capability of the appliance converters 601 and the LAN end station 508.

Figure 27:
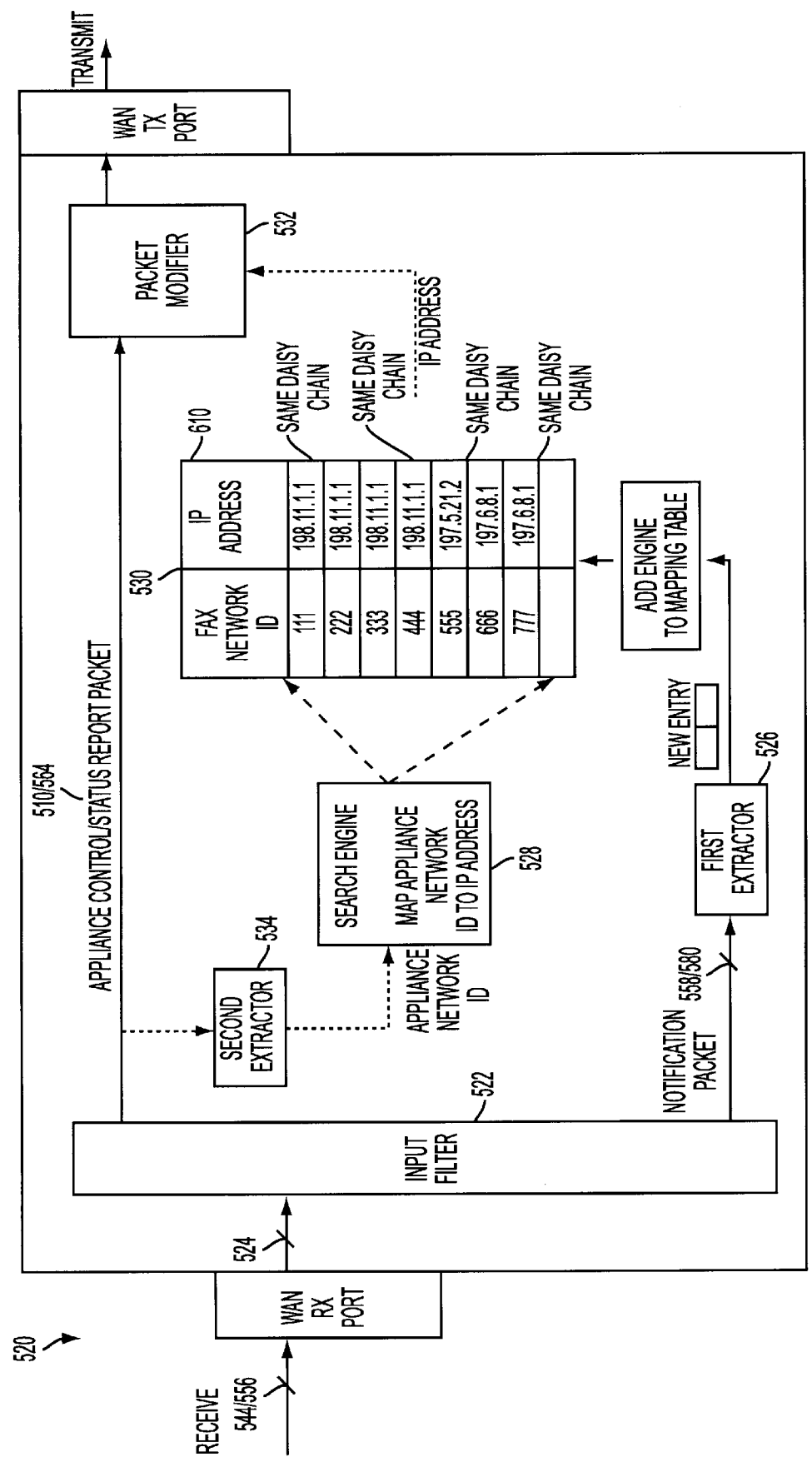
FIG. 27 depicts an appliance network server according to an exemplary embodiment of the invention.

FIG. 27 depicts the appliance network server 520 according to an exemplary embodiment of the invention 500 for implementing the daisy chain configuration 600 of the appliance converters 540. The appliance network server 520 includes the input filter 522 that receives a network packet on a server receive channel 524 and identifies the network packet as either a notification packet 558/580, a status report packet 564 or an appliance control packet 510. When a notification packet 558/580 is received, a first extractor 526 determines a network ID and an IP address contained in the notification packet 558/580 to create a new entry in the mapping table 530. A second extractor 534 determines a destination network ID from the appliance control/status report packet 510/564. Once the network ID is extracted, a search engine 528 determines a destination IP address from the mapping table 530 using the destination network ID as a key. A packet modifier 532 then replaces a destination IP address in the status report/appliance control packet 520/564 with the destination IP address and a source IP address in the status report/appliance control packet 510/564 with an IP address the application network server 520. In order to implement the daisy chain configuration 600, an IP address field 610 of the mapping table 530 is modified to allow duplicate appliance IP addresses.

B. Operation

Figure 22:
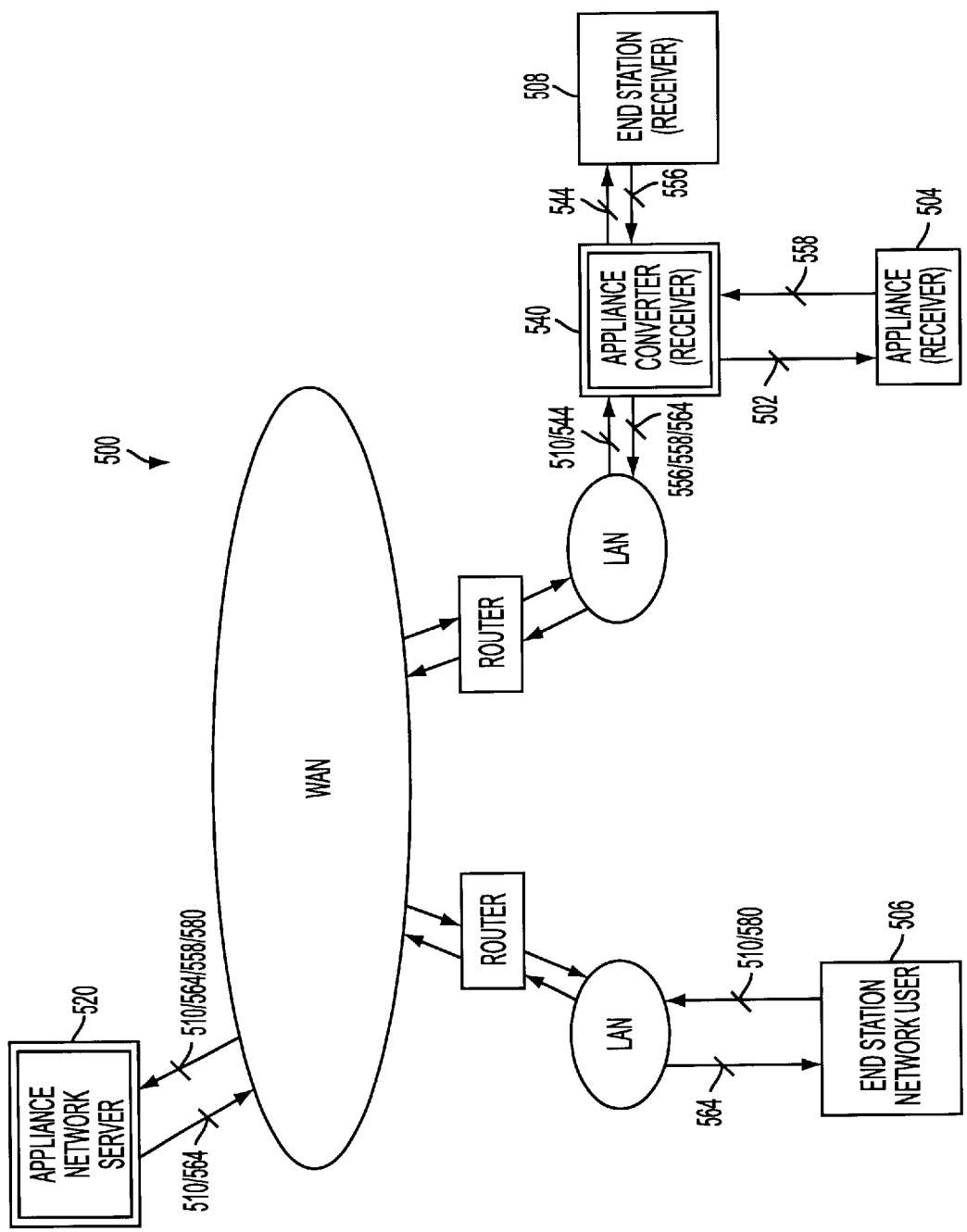
FIG. 22 depicts an appliance control apparatus for asserting a control command to an appliance from a remote network user.

FIG. 28 depicts a procedure 700 of a first embodiment for asserting a control command 502 to an appliance 504 from a remote network user 506 using an appliance control apparatus 500 and an appliance communication protocol, for example, as depicted in FIG. 22. The appliance control apparatus functions in a start-up mode and an operation mode. The appliance control apparatus 500 at step 702 begins in startup mode, wherein an appliance IP address of an appliance side LAN end station 508 is detected. At step 710, a notification packet 558 is generated including a predefined session port number, the appliance IP address and an appliance network ID. At step 712, the notification packet 558 is sent to an appliance network server 520. At step 728, the notification packet 558 is received at the appliance network server 520. The appliance network server 520 includes a mapping table 530 between a destination network ID and a destination IP address. The appliance IP address and the appliance network ID contained within the notification packet 558 are added to the mapping table 530 in order to enable the assertion of the control command 502 to the appliance 504.

Operation mode begins at step 730, wherein an appliance control packet 510 is generated including the predefined session port number, the appliance network ID and the control command 502. At step 732, the appliance control packet 510 is sent to the appliance network server 520. At step 734, the appliance control packet 510 is received by the appliance network server 540 and then re-transmitted to a destination IP address. However, destination IP address is first looked-up in the mapping table 530, using the appliance network ID as a key, in order to re-transmit the appliance control packet 510 to the destination IP address. At step 738, the appliance control packet 510 is intercepted at an appliance converter 540. At step 750, the control command 502 is extracted from the appliance control packet 510. At step 752, a communication link is established with the appliance 504. Finally at step 754, the control command 502 is asserted to the appliance 504 using the appliance communication protocol. Steps 730 through 754 are repeated during operation mode of the appliance control apparatus 500 for each requested control command 502.

FIG. 29 depicts additional procedural method steps 703 of the start-up mode for detecting the appliance IP address of step 702, for example, in the appliance converter 540, as depicted in FIG. 24. At step 704, a transmit channel 572 is monitored for network packets 556 transmitted by the appliance side LAN end station 508. At step 706, a source IP address in a header of the network packet 556 is detected and extracted. Finally at step 708, the source IP address is used as the appliance IP address.

Figure 30:
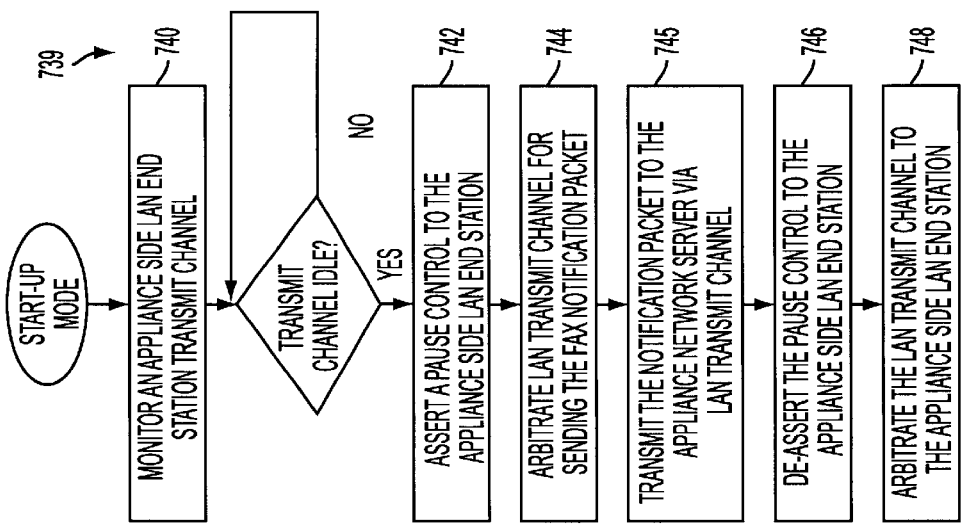
FIG. 30 depicts additional method steps for intercepting an appliance control packet according to an embodiment of the invention.

FIG. 30 depicts additional procedural method steps 739 of the start-up mode for sending the notification packet 558 of step 712, for example, in the appliance converter 540, as depicted in FIG. 24. At step 740, an appliance side LAN end station transmit channel 572 is monitored. At step 742, when the transmit channel 572 is idle, a pause control is asserted to the appliance side LAN end station 508. At step 744, a LAN transmit channel 574 is then arbitrated for sending the notification packet 558. At step 745, the notification packet 558 is transmitted to the appliance network sender 520 via the transmit channel 572. At step 746, the pause control is de-asserted to the appliance side LAN end station 558. Finally at step 748, the LAN transmit channel 574 is arbitrated to the appliance side LAN end station 508.

Figure 31:
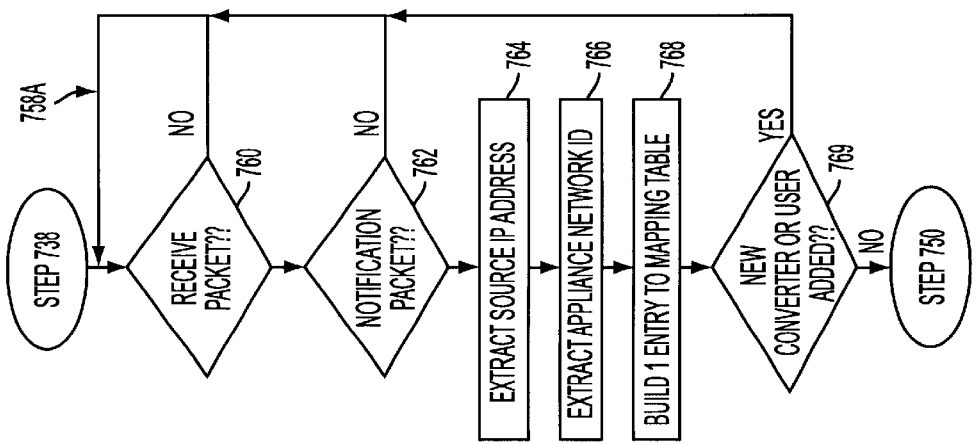
FIG. 31 depicts additional method steps for receiving the notification packet at an appliance network server according to an embodiment of the invention.

FIG. 31 depicts additional procedural method steps 758 for receiving the notification packet 558/580 at the appliance network server 520 of step 728, as depicted in FIGS. 25 and 27. At step 760, a network packet is received from an appliance network server receive channel 524. At step 762, it is determined whether the network packet is a notification packet 558/580. At steps 764 and 766, a source IP address and a source network ID are extracted from the notification packet 558/580 by the first extractor 526. At step 768, a new entry is created in the mapping table 530 including the source network ID and the source IP address. Finally at step 769, these steps are repeated until each new appliance converter 540 or each new remote network user 506 has added to the appliance control apparatus 500.

Figure 32:
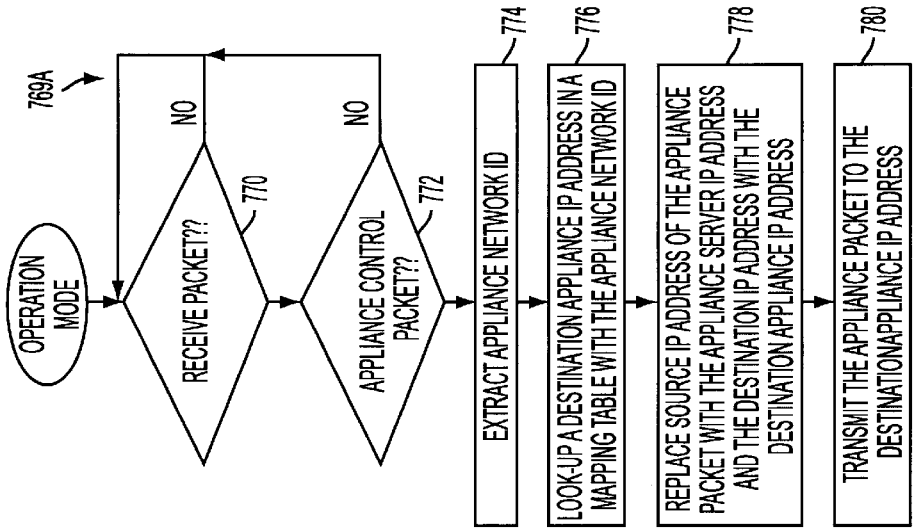
FIG. 32 depicts additional method steps for receiving the appliance control packet at the appliance network server and transmitting the appliance control packet to a destination IP address according to an embodiment of the invention.

FIG. 32 depicts additional procedure method steps 769 for receiving the appliance control packet 510 at the appliance network server 520 and transmitting the appliance control packet 510 to the destination IP address of step 734, as depicted in FIGS. 25 and 27. At step 770, a network packet, transmitted to the appliance network server 540, is received on a server receive channel 524. At step 772, an input filter 522 determines whether the network packet is an appliance control packet 510. At step 774, a second extractor 534 extracts the destination appliance network ID from the appliance control packet 510. At step 776, a search engine 528 determines the destination appliance IP address from the mapping table 530 by using the destination appliance network ID received from the second extractor 534 as a key. At step 778, a packet modifier 532 then modifies a destination IP address and a source IP address in the appliance control packet 510. The packet modifier 532 replaces the destination IP address of the appliance control packet 510 with the destination appliance IP address and the source IP address of the appliance control packet 510 with an IP address the appliance network server 540. Finally at step 780, the appliance control packet 510 is transmitted to the destination IP address.

Figure 33:
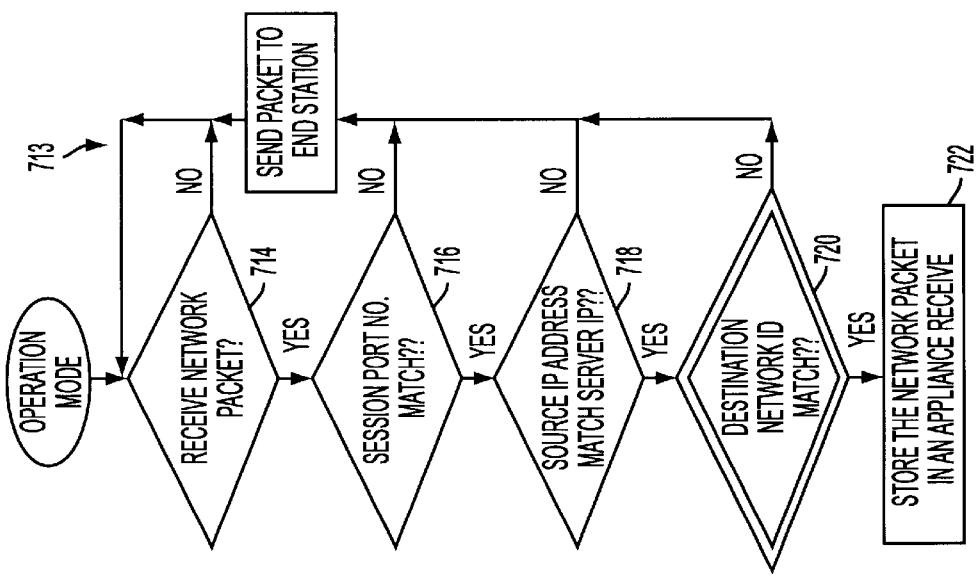
FIG. 33 depicts additional method steps for sending a notification packet to the appliance network server according to an embodiment of the invention.

FIG. 33 depicts additional procedural method steps 713 for intercepting the appliance control packet 510 of step 738, for example, in the appliance converter 540, as depicted in FIG. 23. At step 714, a network packet 544/510 transmitted the receiver side LAN end station 508, is received on an appliance converter receive channel 543. At steps 71, 718, and 720, a session port number, a source address, and a destination network ID of the network packet 544/510 are analyzed. At step 722, when the session port number equals the predetermined session port number, the source address matches the appliance server IP address, and the destination network ID matches the network ID, the appliance control packet 510 is stored in an appliance received buffer 546. Otherwise at step 721, the network packet 554 is transmitted to the receiver side LAN end station.

Figure 34:
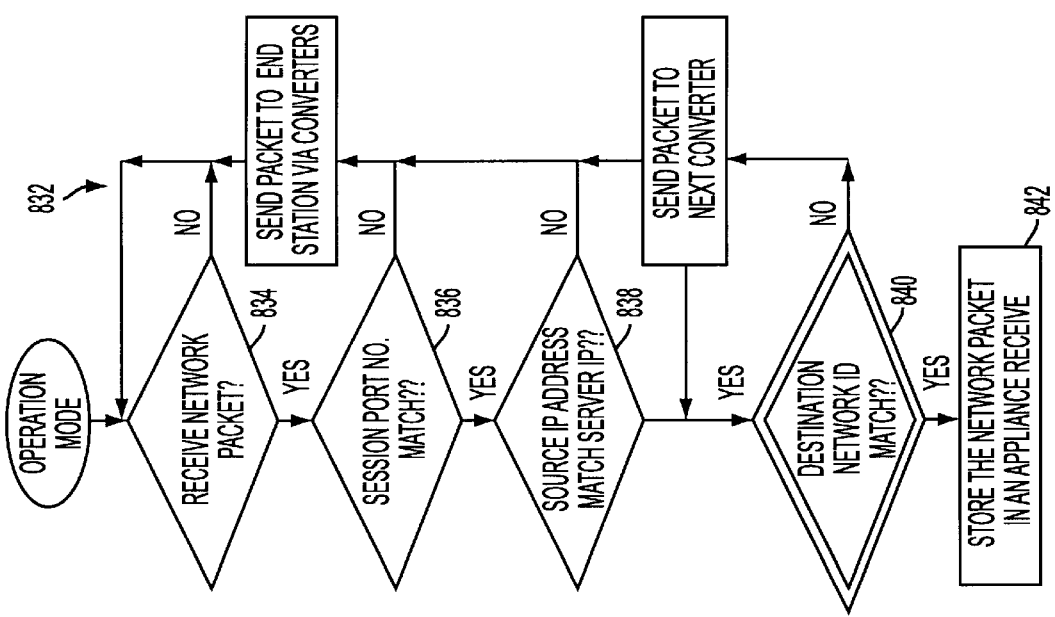
FIG. 34 depicts additional method steps for intercepting the appliance control packet in the daisy chain configuration of the appliance converters according to an embodiment of the invention.

FIG. 34 depicts additional procedural method steps 832 for intercepting the appliance control packet 510 of step 738, for example, in the daisy chain configuration 600 of the appliance converters 601, as depicted in FIGS. 24 and 26. At step 834, a network packet 556/510, transmitted to the receiver side LAN end station 508, is received on an appliance converter receive channel 543. At steps 836 and 838, a session port number and a source IP address of the network packet 556/510 are analyzed by a last appliance converter 606. At step 840, when the session port number equals the predetermined session port number and the source IP address matches the appliance server IP address, a destination network ID of the network packet 556 is analyzed. Otherwise, the network packet 556 is transmitted to the LAN end station 508 via the plurality of converters 601. At step 842, when the destination network ID matches the appliance network ID of the respective appliance converter, the network packet 556 is stored in an appliance receive buffer 546. Otherwise, the network packet 556 is transmitted to the next appliance converter along the plurality of daisy chained appliance converters 601. Steps 834 through 840 are repeated until an appliance network IP of a respective appliance converter matches the destination network ID.

Figure 35:
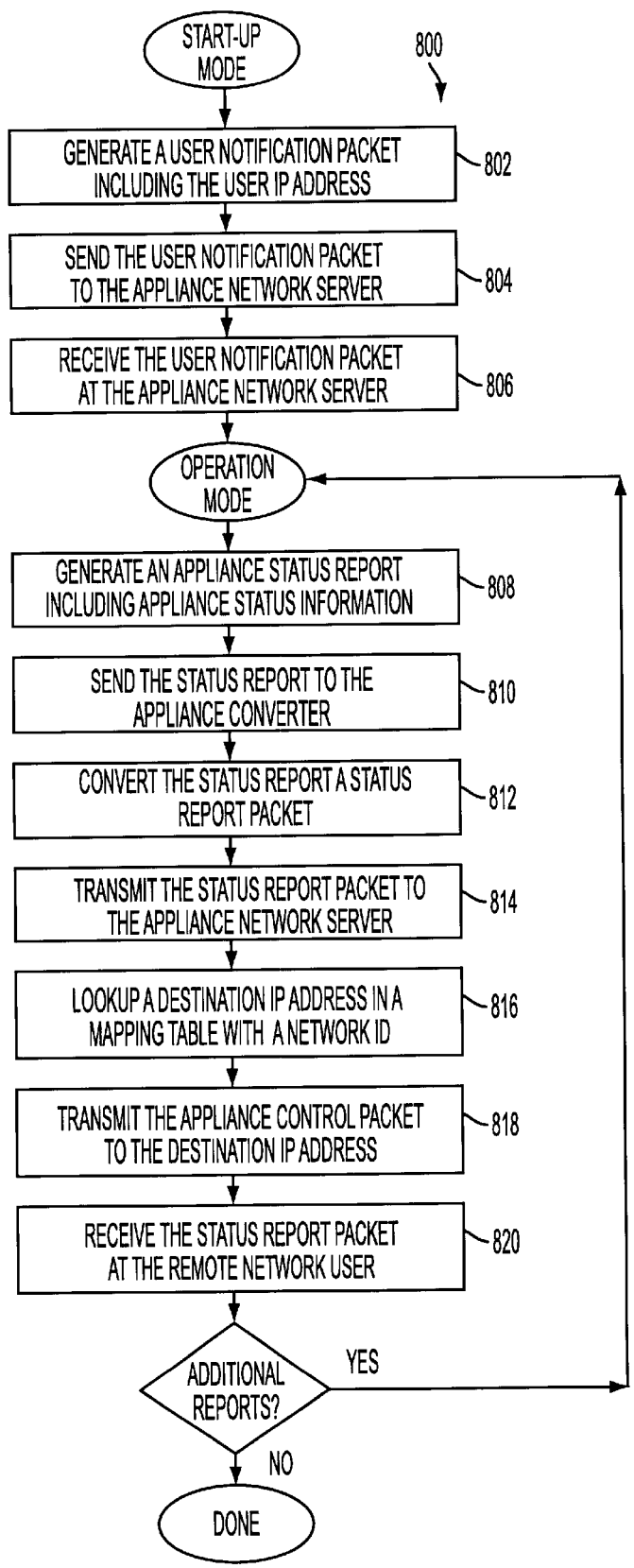
FIG. 35 depicts additional method steps for generating and transmitting an appliance status report to the remote network user according to an embodiment of the invention.

FIG. 35 depicts additional procedural method steps 800 wherein the appliance 504 generates a status report 552 and transmits the status report 552 to the remote network user 506, for example as depicted in FIGS. 22 and 26. At step 802, a user notification packet 580 is generated including the predefined session port number in a header of the user notification packet 580, a user network ID and a user IP address. At step 804, the user notification packet 580 is sent to the appliance network server 520. At step 806, the user notification packet 580 is received at the appliance network server 520. An entry in the mapping table 580 is then created including the user network ID and user IP address. At step 808, an appliance status report 552 including status information of the appliance 504 is generated. At step 810, the status report 552 is sent to the appliance converter 540. At step 812, the status report 552 is converted to a network packet format to generate a status report packet 564 including the predefined session port number in an identification field of the status report packet 564 and the user network ID.

Once the status report packet 552 is generated, at step 814, the status report packet 564 is transmitted to the appliance network server 520. Following the receipt of the status report packet 564 at step 816, a lookup is performed of the destination IP address in the mapping table 530 of the appliance network server 520 using the user network ID as a key. At step 818, the appliance control packet 510 is transmitted to the destination IP address. Finally at step 820, the status report packet 564 is received at the remote network user 506 for review of the appliance status report 552. The status report 552 of the appliance 504 is either generated in response to a control command 502 request from the remote network user 506 or automatically generated and periodically transmitted to a remote network user 506.

3. Conclusion

Exemplary embodiments have been described with reference to specific configurations. Those skilled in the art will appreciate that various changes and modifications can be made while remaining within the scope of the claims. It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the converters of the invention can be used to handle both FAX communication and appliance control packet or status report packets. In addition, although the preferred embodiment described herein is directed to a FAX-through data network, it will be appreciated by those skilled in the art that the teachings of the present invention can be applied to other systems, for remote access control of virtually any apparatus provided a communication protocol is defined.

The invention provides many advantages over known techniques. The present invention includes the ability to share the IP address of a LAN end station, thereby eliminating the need for additional IP addresses. This feature results in apparatus wherein each individual FAX is not required to assume full data network communication protocol operations, which are left to the LAN end station. Consequently, network administration effort required to manage additional FAX devices is negligible. In addition, the invention also eliminates local and long distance toll cost charges for FAX transmissions which can become expensive. Moreover, the invention allows remote access control of appliances which promotes the mobility that is now so prevalent in our society.

Having disclosed exemplary embodiments and the best mode, modifications and variations may be made to the disclosed embodiments while remaining within the scope of the invention as defined by the following claims.

What is claimed is:

1. A method of transmitting a FAX communication from a sender FAX to a receiver FAX without routing a signal through a PSTN, the method comprising steps of:
   detecting a receiver IP address of a receiver side LAN end station;
   generating a notification packet including a predefined session port number, the receiver IP address and a receiver FAX-network ID;
   sending the notification packet to a FAX-network server;
   receiving the notification packet at the FAX-network server, wherein the FAX-network server includes a mapping table between a destination FAX-network ID and a destination IP address;
   establishing a communication link between a first converter and the sender FAX without routing a signal through a PSTN;
   receiving the FAX communication from the sender FAX at the first converter;
   generating a FAX packet by converting the FAX communication to a network packet format including the predefined session port number and the receiver FAX-network ID;
   sending the FAX packet to the FAX-network server;
   transmitting the FAX packet to the destination IP address looked-up in the mapping table of the FAX-network server with the receiver FAX-network ID as a key;
   intercepting the FAX packet at a second converter;
   extracting the FAX communication from the FAX packet;
   establishing a communication link with the receiver FAX machine without routing a signal through a PSTN; and
   transmitting the FAX communication to the receiver FAX;
   wherein the sending the notification packet step further includes:
     monitoring a receiver side LAN end station transmit channel;
     when the transmit channel is idle, asserting a pause control to the receiver side LAN end station;
     arbitrating a LAN transmit channel for sending the notification packet;
     transmitting the notification packet to the FAX-network server via the LAN transmit channel;
     de-asserting the pause control to the receiver side LAN end station; and
     arbitrating the LAN transmit channel to the receiver side LAN end station.

2. The method of claim 1, wherein the method further includes steps of:
   detecting a sender IP address of a sender side LAN end station;
   generating a notification packet including the predefined session port number in a header of the notification packet, the sender IP address and a sender FAX-network ID; and
   sending the notification packet to the FAX-network server,
   wherein a new entry in the mapping table is created containing the sender FAX-network ID and the sender IP address, such that a FAX communication can be transmitted to the sender FAX.

3. The method of claim 1, wherein the receiving the notification packet step further includes steps of:
   receiving a network packet;
   determining whether the network packet is a notification packet based on an identification field in the network packet;
   extracting a source IP address and a source FAX-network ID from the notification packet;
   creating a new entry in the mapping table including the source FAX-network ID and the source IP address; and
   repeating these steps for each sender/receiver FAX added to a FAX through data network.

4. The method of claim 1, wherein the step of establishing a communication link between a first converter and the sender FAX further includes steps of:
   monitoring an on/off hook of the sender FAX machine;
   generating a dial tone to the sender FAX machine;
   establishing a communication channel between the sender FAX machine and a PBX emulation device;
   establishing a FAX communication protocol with the sender FAX machine;
   registering a destination FAX telephone number to determine whether the destination FAX phone number is a FAX-network ID;
   when the destination FAX phone number is a FAX-network ID, storing the FAX communication to a FAX transmit buffer;
   when the destination FAX phone number is a FAX phone number, routing the FAX communication to the destination FAX machine via the PSTN; and
   disconnecting the line when the sender FAX machine is on hook.

5. The method of claim 1, wherein the transmitting the FAX packet step further includes steps of:
   receiving the FAX packet at the FAX-network server;
   extracting a FAX-network ID from the FAX packet;
   looking-up a destination FAX IP address in the mapping table with the FAX-network ID as a key;
   repackaging the FAX packet with a FAX-network server IP address as the source address of the FAX packet and the destination FAX IP address as the destination IP address of the FAX packet; and
   transmitting the FAX packet to the destination FAX IP address.

6. The method of claim 1, wherein the intercepting step further includes steps of:
receiving a network packet transmitted to the receiver side LAN end station;
analyzing a session port number and a source address of the network packet;
when the session port number equals the predetermined session port number and the source address matches the FAX-network server IP address, storing the network packet in a FAX receive buffer; and
otherwise, sending the network packet to the receiver side LAN end station.

7. The method of claim 1, wherein the step of establishing a communication link with the receiver FAX further includes steps of:
generating a ring/answer request to the receiver FAX machine with a PBX emulation device;
establishing a communication channel between the receiver FAX and the PBX emulation device;
establishing a FAX communication protocol with the receiver FAX; and
retrieving the FAX communication from a FAX receive buffer.

8. A method of transmitting a FAX communication from a sender FAX to a receiver FAX without routing a signal through a PSTN, the method comprising steps of:
detecting a receiver IP address of a receiver side LAN end station;
generating a notification packet including a predefined session port number, the receiver IP address and a receiver FAX-network ID;
sending the notification packet to a FAX-network server;
receiving the notification packet at the FAX-network server, wherein the FAX-network server includes a mapping table between a destination FAX-network ID and a destination IP address;
establishing a communication link between a first converter and the sender FAX without routing a signal through a PSTN;
receiving the FAX communication from the sender FAX at the first converter;
generating a FAX packet by converting the FAX communication to a network packet format including the predefined session port number and the receiver FAX-network ID;
sending the FAX packet to the FAX-network server;
transmitting the FAX packet to the destination IP address looked-up in the mapping table of the FAX-network server with the receiver FAX-network ID as a key;
intercepting the FAX packet at a second converter;
extracting the FAX communication from the FAX packet;
establishing a communication link with the receiver FAX machine without routing a signal through a PSTN; and
transmitting the FAX communication to the receiver FAX;
wherein the sending the FAX packet step further includes steps of:
monitoring a sender side LAN end station transmit channel;
when the transmit channel is idle, asserting a pause control to the sender side LAN end station;
arbitrating a LAN transmit channel for sending the FAX packet;
transmitting the FAX packet to the FAX-network server via the LAN transmit channel;
de-asserting the pause control to the sender side LAN end station; and
arbitrating the LAN transmit channel to the sender side LAN end station.

9. The method of claim 8, wherein the transmitting the FAX packet step further includes steps of:
receiving the FAX packet at the FAX-network server;
extracting a FAX-network ID from the FAX packet;
looking-up a destination FAX IP address in the mapping table with the FAX-network ID as a key;
repackaging the FAX packet with a FAX-network server IP address as the source address of the FAX packet and the destination FAX IP address as the destination IP address of the FAX packet; and
transmitting the FAX packet to the destination FAX IP address.

10. The method of claim 8, wherein the intercepting step further includes steps of:
receiving a network packet transmitted to the receiver side LAN end station;
analyzing a session port number and a source address of the network packet;
when the session port number equals the predetermined session port number and the source address matches the FAX-network server IP address, storing the network packet in a FAX receive buffer; and
otherwise, sending the network packet to the receiver side LAN end station.

11. The method of claim 8, wherein the step of establishing a communication link with the receiver FAX further includes steps of:
generating a ring/answer request to the receiver FAX machine with a PBX emulation device;
establishing a communication channel between the receiver FAX and the PBX emulation device;
establishing a FAX communication protocol with the receiver FAX; and
retrieving the FAX communication from a FAX receive buffer.

12. An appliance control apparatus for asserting a control command to an appliance from a remote network user using an appliance communication protocol, the appliance control apparatus comprised of:
an appliance side LAN end station having an appliance IP address;
an appliance control packet generated by the remote network user and including a predefined session port number, an appliance network ID and the control command;
an appliance network server configured to receive the appliance control packet, extract the appliance network ID, lookup a corresponding destination IP address in a mapping table, and forward the appliance control packet to the destination IP address; and
an appliance converter configured to intercept and identify the appliance control packet, extract the control command and assert the control command to the appliance using the appliance communication protocol, the appliance converter comprising:
a receive channel filter configured to monitor a session port number and a source IP address of packets transmitted to the appliance side LAN end station in order to identify and intercept the appliance control packet, such that the session port number matches the predefined session port number and the source IP address matches an IP address of the appliance network server;

an appliance receive buffer configured to store the appliance control packet; and a network format to appliance format unpack unit configured to extract the control command from the appliance control packet and forward the control command to the appliance machine via an appliance communication port, such that the appliance communication port establishes the appliance communication protocol with the appliance to assert the control command;

the appliance generating a status report, and the appliance converter f further comprising:

a source IP extractor configured to detect the appliance IP address by intercepting a packet transmitted by the appliance side LAN end station to generate a notification packet including the predefined session port number in the notification packet, the appliance network ID and the appliance IP address;

an appliance transmit buffer configured to store the FAX communication received from the appliance via the appliance communication port, wherein the appliance communication port establishes a communication with the appliance using the appliance communication protocol;

an appliance to network package unit configured to receive the status report and convert the status report to the network packet format to generate a status report packet with the predefined session port number in a header of the status report packet and a user network ID of the remote network user;

a startup switch configured to receive the notification packet and the status report packet, such that once the notification packet is transferred to an output of the startup switch, the status report packet is transferred to the output thereafter; and a transmit channel arbitrator configured to monitor an appliance side end station transmit channel, such that once the transmit channel is idle the notification packet/status report packet is transferred to the appliance network server via the transmit channel of the LAN communication port.

13. An appliance control apparatus for asserting a control command to an appliance from a remote network user using an appliance communication protocol, the apparatus comprised of:

an appliance side LAN end station having an appliance IP address;

an appliance control packet generated by the remote network user and including a predefined session port number, an appliance network ID and the control command;

an appliance network server configured to receive the appliance control packet, extract the appliance network ID, lookup a corresponding destination IP address in a mapping table, and forward the appliance control packet to the destination IP address; and an appliance converter configured to intercept and identify the appliance control packet, extract the control command and assert the control command to the appliance using the appliance communication protocol;

the appliance network server further comprising:

an input filter configured to receive a network packet and identify notification packets, status report packets and appliance control packets based on an identification field of the network packet;

a first extractor configured to determined a network ID and an IP address contained in the notification packet to create a new entry in the mapping table;

a second extractor configured to determine a destination network ID from the appliance control packet;

a search engine configured to determine a destination IP address from the look-up table using the destination network ID as a key; and a packet modifier configured to replace a destination IP address in a header of the status report/appliance control packet with the destination IP address and a source IP address in the header with an IP address of the application network server.

14. An appliance control apparatus for asserting a control command to an appliance from a remote network user using an appliance communication protocol, the appliance control apparatus comprised of:

an appliance side LAN end station having an appliance IP address;

an appliance control packet generated by the remote network user and including a predefined session port number, an appliance network ID and the control command;

an appliance network server configured to receive the appliance control packet, extract the appliance network ID, lookup a corresponding destination IP address in a mapping table, and forward the appliance control packet to the destination IP address; and an appliance converter configured to intercept and identify the appliance control packet, extract the control command and assert the control command to the appliance using the appliance communication protocol, the appliance converter comprising:

a receive channel filter configured to monitor a session port number and a source IP address of packets transmitted to the appliance side LAN end station in order to identify and intercept the appliance control packet, such that the session port number matches the predefined session port number and the source IP address matches an IP address of the appliance network server;

an appliance receive buffer configured to store the appliance control packet; and a network format to appliance format unpack unit configured to extract the control command from the appliance control packet and forward the control command to the appliance machine via an appliance communication port, such that the appliance communication port establishes the appliance communication protocol with the appliance to assert the control command;

the appliance control apparatus further including:

a plurality of appliance converters arranged in a daisy chain configuration between a LAN and the appliance side LAN end station, wherein a first converter is directly connected to the appliance side LAN end station and a last converter is directly connected to the LAN; and a plurality of appliances each attached to one of the plurality of appliance converters;

the interception and identification of the appliance control packet begins with the last converter and continues for each of the plurality of appliance converters until the first converter is reached, such that the plurality of converter are further configured to match the appliance network ID in the appliance control packet with a network ID of the respective appliance converter.

15. The apparatus of claim 14, wherein each of the appliance also generates a status report, such that each of the appliance converter is further comprised of:

a source IP extractor configured to detect the appliance IP address by intercepting a packet transmitted by the appliance side LAN end station to generate a notification packet including the predefined session port number in the notification packet, the appliance network ID and the appliance IP address;

an appliance transmit buffer configured to store the status report received from the appliance via the appliance communication port, wherein the appliance communication port establishes a communication with the appliance using the appliance communication protocol;

a appliance to network package unit configured to receive the status report and convert the status report to the network packet format to generate a status report packet with the predefined session port number in a header of the status report packet and a user network ID of the remote network user;

a startup switch configured to receive the notification packet and the status report packet, such that once the notification packet is transferred to an output of the startup switch, the status report packet is transferred to the output thereafter; and a transmit channel arbitrator configured to monitor an appliance side end station transmit channel, such that once the transmit channel is idle a LAN pause control is issued to the appliance LAN end station and the plurality of appliance converters, and the notification packet/status report packet is transferred to the appliance network server via the transmit channel of the LAN communication port.

16. The apparatus of claim 14, wherein the appliance-network server is comprised of:

an input filter configured to receive a network packet and identify notification packets, status report packets and appliance control packets;

a first extractor configured to determined a network ID and an IP address contained in the notification packet to create a new entry in the mapping table, where an ID address field of the mapping table includes duplicate appliance IP address for the daisy chain configuration appliance converters;

a second extractor configured to determine a destination appliance network ID from the appliance control packet; and a search engine configured to determine a destination appliance IP address from the look-up table using the destination appliance network ID as a key;

a packet modifier configured to replace a destination IP address in a header of the status report/appliance control packet with an IP address the application network server.

17. A method of asserting a control command to an appliance from a remote network user using an appliance communication protocol, the method comprising steps of:

detecting an appliance IP address of an appliance side LAN end station, the detecting including: intercepting a network packet transmitted by the appliance side LAN end station; determining a source IP address in a header of the network packet; and using the source IP address as the appliance IP address;

generating a notification packet including a predefined session port number, the appliance IP address and an appliance network ID;

sending the notification packet to an appliance network server;

receiving the notification packet at the appliance network server, wherein the appliance network server includes a mapping table between a destination network ID and a destination IP address;

generating an appliance control packet including the predefined session port number, the appliance network ID and the control command;

sending the appliance control packet to the appliance network server;

transmitting the appliance packet to the destination IP address looked-up in the mapping table of the appliance network server with the appliance network ID as a key;

intercepting the appliance packet at an appliance converter;

extracting the control command from the appliance packet;

establishing a communication link with the appliance without routing a signal through the PSTN; and asserting the control command to the appliance using the appliance communication protocol;

the sending the notification packet step further includes:
monitoring an appliance side LAN end station transmit channel;
when the transmit channel is idle, asserting a pause control to the appliance side LAN end station;
arbitrating a LAN transmit channel for sending the notification packet;
transmitting the notification packet to the appliance network server via the LAN transmit channel;
de-asserting the pause control to the appliance side LAN end station; and
arbitrating the LAN transmit channel to the appliance side LAN end station.

18. The method of claim 17, wherein the receiving the notification packet step further includes steps of:

receiving a network packet;
determining whether the network packet is a notification packet based on an identification field in the network packet;
extracting a source IP address and a source appliance ID from the notification packet;
creating a new entry in the mapping table including the source appliance ID and the source IP address; and
repeating these steps for each appliance converter FAX added to an appliance control appliance.

19. The method of claim 17, wherein the transmitting the appliance packet step further includes steps of:

receiving the appliance packet at the appliance network server;
extracting a appliance network IP from the appliance packet;
looking-up a destination appliance IP address in the mapping table with the appliance network ID as a key;
repackaging the appliance packet with an appliance network server IP address as the source address of the appliance packet and the destination appliance IP address as the destination IP address of the appliance packet; and transmitting the appliance packet to the destination appliance IP address.

20. The method of claim 17, wherein the intercepting step further includes steps of:
  receiving a network packet transmitted to the appliance side LAN end station;
  analyzing a session port number and a source address of the network packet;
  when the session port number equals the predetermined session port number and the source address matches the appliance server IP address, storing the network packet in an appliance receive buffer; and
  otherwise, sending the network packet to the appliance side LAN end station.

21. A method of asserting a control command to an appliance from a remote network user using an appliance communication protocol, the method comprising steps of:
  detecting an appliance IP address of an appliance side LAN end station;
  generating a notification packet including a predefined session port number, the appliance IP address and an appliance network ID;
  sending the notification packet to an appliance network server;
  receiving the notification packet at the appliance network server, wherein the appliance network server includes a mapping table between a destination network ID and a destination IP address;
  generating an appliance control packet including the predefined session port number, the appliance network ID and the control command;
  sending the appliance control packet to the appliance network server;
  transmitting the appliance packet to the destination IP address looked-up in the mapping table of the appliance network server with the appliance network ID as a key;
  intercepting the appliance packet at an appliance converter;
  extracting the control command from the appliance packet;
  establishing a communication link with the appliance without routing a signal through the PSTN; and
  asserting the control command to the appliance using the appliance communication protocol;
  the intercepting the appliance packet at an appliance converter step further includes:
    receiving a network packet transmitted to the appliance side LAN end station;
    analyzing a session port number and a source address of the network packet; and
      (i) when the session port number equals the predetermined session port number and the source address matches the appliance server IP address, analyzing a destination network ID of the network packet;
      (ii) when the destination network ID matches a network ID of a respective appliance converter, storing the network packet in an appliance receive buffer; and
      (iii) otherwise, sending the network packet to a previous stage appliance converter in a daisy chain configuration; and
    repeating the receiving, analyzing, analyzing, storing and sending steps until the network packet is stored in an appliance receive buffer.

22. A method of asserting a control command to an appliance from a remote network user using an appliance communication protocol and wherein the appliance transmits a status report to the remote network user, the method comprising steps of:
  detecting an appliance IP address of an appliance side LAN end station;
  generating a notification packet including a predefined session port number, the appliance IP address and an appliance network ID;
  sending the notification packet to an appliance network server;
  receiving the notification packet at the appliance network server, wherein the appliance network server includes a mapping table between a destination network ID and a destination IP address;
  generating an appliance control packet including the predefined session port number, the appliance network ID and the control command;
  sending the appliance control packet to the appliance network server;
  transmitting the appliance packet to the destination IP address looked-up in the mapping table of the appliance network server with the appliance network ID as a key;
  intercepting the appliance packet at an appliance converter;
  extracting the control command from the appliance packet;
  establishing a communication link with the appliance without routing a signal through the PSTN;
  asserting the control command to the appliance using the appliance communication protocol;
  generating a user notification packet including the predefined session port number in a header of the user notification packet, a user network ID and a user IP address;
  sending the user notification packet to an appliance network server;
  receiving the user notification packet at the appliance network server and creating an entry in the mapping table including the user network ID and the user IP address;
  generating an appliance status report including status information of the appliance;
  sending the status report to the appliance converter;
  converting the appliance status report to a network packet to generate a status report packet including the predefined session port number in a header of the status report packet and the user network ID;
  transmitting the status report packet to the appliance network server;
  performing a lookup of the destination IP address in the mapping table of the appliance network server with the user network ID as a key;
  transmitting the appliance packet to the destination IP address; and
  receiving the network data packet at the remote network user for review of the appliance status report.

23. The method of claim 22, wherein the status report of the appliance is generated in response to a command control request from the remote network user.

24. The method of claim 22, wherein the status report of the appliance is automatically generated and periodically transmitted to a remote network user.

* * * * *